(12) United States Patent
Huxham

(10) Patent No.: US 9,686,235 B2
(45) Date of Patent: Jun. 20, 2017

(54) MOBILE BANKING SYSTEM WITH CRYPTOGRAPHIC EXPANSION DEVICE

(75) Inventor: Horatio Nelson Huxham, Cape Town (ZA)

(73) Assignee: Visa International Service Association, San Francisco, CA (US)

(*) Notice: Subject to any disclaimer, the term of this patent is extended or adjusted under 35 U.S.C. 154(b) by 672 days.

(21) Appl. No.: 14/234,101

(22) PCT Filed: Jul. 20, 2012

(86) PCT No.: PCT/US2012/047645
§ 371 (c)(1),
(2), (4) Date: Mar. 11, 2014

(87) PCT Pub. No.: WO2013/013168
PCT Pub. Date: Jan. 24, 2013

(65) Prior Publication Data
US 2014/0188738 A1    Jul. 3, 2014

Related U.S. Application Data

(60) Provisional application No. 61/510,023, filed on Jul. 20, 2011.

(51) Int. Cl.
*G06K 5/00* (2006.01)
*H04L 29/06* (2006.01)
(Continued)

(52) U.S. Cl.
CPC ........... *H04L 63/02* (2013.01); *G06Q 20/027* (2013.01); *G06Q 20/325* (2013.01);
(Continued)

(58) Field of Classification Search
USPC .................................. 235/492, 380; 361/715
See application file for complete search history.

(56) References Cited

U.S. PATENT DOCUMENTS 3,877,808 A    4/1975    Jasperson, Jr.
5,668,977 A    9/1997    Swanstrom et al.
(Continued)

FOREIGN PATENT DOCUMENTS

CN        2845170 Y     12/2006
CN        101193135 A    6/2008
(Continued)

OTHER PUBLICATIONS

European Search Report dated Dec. 2, 2014 for European Patent Application No. 12815102.4, 7 pages.
(Continued)

*Primary Examiner* — Daniel Hess
(74) *Attorney, Agent, or Firm* — Kilpatrick Townsend & Stockton LLP

(57) ABSTRACT

A mobile banking system that uses a cryptographic expansion device attached to a communication component of a mobile device and a secure gateway device to enable end-to-end secure communications between the mobile device and a payment processing network is disclosed. The cryptographic expansion device enables the mobile device to perform cryptographic operations on communications sent to and from the mobile device. The secure gateway device prevents unauthorized accesses to the payment processing network.

20 Claims, 9 Drawing Sheets

(51) Int. Cl.
| | |
|---|---|
| *H04W 12/02* | (2009.01) |
| *H04W 12/08* | (2009.01) |
| *G06Q 20/02* | (2012.01) |
| *G06Q 20/32* | (2012.01) |
| *G06Q 20/38* | (2012.01) |
| *H05K 3/32* | (2006.01) |

(52) U.S. Cl.
CPC ..... *G06Q 20/3223* (2013.01); *G06Q 20/3226* (2013.01); *G06Q 20/3229* (2013.01); *G06Q 20/3278* (2013.01); *G06Q 20/382* (2013.01); *G06Q 20/3823* (2013.01); *H04L 63/0464* (2013.01); *H04L 63/08* (2013.01); *H04L 63/10* (2013.01); *H04W 12/02* (2013.01); *H04W 12/08* (2013.01); *H05K 3/321* (2013.01); *H04L 63/0281* (2013.01); *H04L 2463/102* (2013.01); *Y10T 29/4913* (2015.01); *Y10T 29/53174* (2015.01)

(56) References Cited

U.S. PATENT DOCUMENTS

| | | | |
|---|---|---|---|
| 5,892,900 | A | 4/1999 | Ginter et al. |
| 6,438,386 | B2 | 8/2002 | Joshi et al. |
| 6,944,478 | B1 | 9/2005 | Durand |
| 7,291,019 | B2 | 11/2007 | Nishizawa et al. |
| 7,359,512 | B1 | 4/2008 | Elliott |
| 7,380,125 | B2 | 5/2008 | Di Luoffo et al. |
| 7,991,434 | B2 | 8/2011 | Yen et al. |
| 8,078,226 | B2 | 12/2011 | Lo et al. |
| 8,275,312 | B2 | 9/2012 | Fisher |
| 8,280,441 | B2 | 10/2012 | Lo et al. |
| 8,290,433 | B2 | 10/2012 | Fisher et al. |
| 8,332,272 | B2 | 12/2012 | Fisher |
| 8,644,025 | B2 * | 2/2014 | Luo .................. G06K 19/07 361/715 |
| 8,683,053 | B2 | 3/2014 | Asveren et al. |
| 2004/0103283 | A1 * | 5/2004 | Hornak .................. H04L 29/06 713/175 |
| 2005/0094637 | A1 | 5/2005 | Umesawa |
| 2006/0055506 | A1 | 3/2006 | Nicolas |
| 2006/0074698 | A1 | 4/2006 | Bishop et al. |
| 2006/0175416 | A1 | 8/2006 | Ho |
| 2006/0175417 | A1 | 8/2006 | Ho |
| 2006/0175418 | A1 | 8/2006 | Ho |
| 2007/0028104 | A1 | 2/2007 | Cohen et al. |
| 2007/0040258 | A1 | 2/2007 | Sheats |
| 2007/0124409 | A1 | 5/2007 | Sibert |
| 2007/0131780 | A1 | 6/2007 | Ho |
| 2007/0213096 | A1 | 9/2007 | Bell et al. |
| 2007/0245413 | A1 | 10/2007 | Andolina et al. |
| 2007/0262156 | A1 * | 11/2007 | Chen .................. H04B 1/3816 235/492 |
| 2008/0029609 | A1 | 2/2008 | Ho |
| 2008/0076474 | A1 | 3/2008 | Ho |
| 2008/0083827 | A1 | 4/2008 | Ho |
| 2008/0099559 | A1 | 5/2008 | Lo et al. |
| 2008/0161051 | A1 | 7/2008 | Schobbert et al. |
| 2008/0169640 | A1 | 7/2008 | Scheir |
| 2009/0181721 | A1 | 7/2009 | Nishizawa et al. |
| 2009/0200381 | A1 | 8/2009 | Schober et al. |
| 2009/0227234 | A1 | 9/2009 | Bosch et al. |
| 2010/0190528 | A1 | 7/2010 | Hsiao et al. |
| 2010/0191602 | A1 | 7/2010 | Mikkelsen et al. |
| 2010/0267419 | A1 | 10/2010 | Nishizawa et al. |
| 2010/0268829 | A1 | 10/2010 | Ly et al. |
| 2011/0022835 | A1 | 1/2011 | Schibuk |
| 2011/0103586 | A1 | 5/2011 | Nobre |
| 2011/0105183 | A1 | 5/2011 | Hsiao et al. |
| 2011/0122827 | A1 | 5/2011 | Bjorsell et al. |
| 2011/0149533 | A1 | 6/2011 | Luo et al. |
| 2011/0315779 | A1 | 12/2011 | Bidin et al. |
| 2013/0189998 | A1 | 7/2013 | Stewart |

FOREIGN PATENT DOCUMENTS

| | | |
|---|---|---|
| CN | 101193372 A | 6/2008 |
| CN | 101826164 A | 9/2010 |
| CN | 102104029 A | 6/2011 |
| EP | 2239691 A1 | 10/2010 |
| JP | 2007-058572 A | 3/2007 |
| WO | 2005-006598 A1 | 1/2005 |
| WO | 2009-044371 A1 | 4/2009 |
| WO | 2009-082334 A1 | 7/2009 |
| WO | 2012-055726 A1 | 5/2012 |

OTHER PUBLICATIONS

Non-Final Office Action dated May 22, 2015 for U.S. Appl. No. 13/875,985, 12 pages.
Non-Final Office Action dated Jul. 10, 2015 for U.S. Appl. No. 14/234,130, 22 pages.
Notice of Allowance dated Aug. 6, 2014 for U.S. Appl. No. 14/234,139, 15 pages.
Non-Final Office Action dated Oct. 21, 2014 for U.S. Appl. No. 13/875,985, 17 pages.
Office Action mailed Feb. 26, 2016 in U.S. Appl. No. 14/532,876, 10 pages.
Examination Report dated May 27, 2016 in ARIPO Application No. AP/P/2014/007430, 8 pages.
International Search Report and Written Opinion issued on Mar. 25, 2013 for International Patent Application No. PCT/US2012/047645, 10 pages.
International Preliminary Report on Patentability issued on Jan. 30, 2014 for International Patent Application No. PCT/US2012/047645, 7 pages.
International Search Report and Written Opinion mailed on Jan. 28, 2013 for International Patent Application No. PCT/US2012/047687, 8 pages.
International Preliminary Report on Patentability mailed on Jan. 30, 2014 for International Patent Application No. PCT/US2012/047687, 5 pages.
International Search Report and Written Opinion mailed Jan. 17, 2013 for International Patent Application No. PCT/US2012/047693, 9 pages.
International Search Report and Written Opinion mailed Sep. 17, 2013 for international Patent Application No. PCT/US2013/039252.
International Preliminary Report on Patentability mailed Jan. 30, 2014 for International Patent Application No. PCT/US2012/047693, 6 pages.
Examination Report dated Oct. 16, 2015 for ARIPO Patent Application No. AP/P/2014/007428, 5 pages.
Final Office Action dated Nov. 3, 2015 for U.S. Appl. No. 13/875,985, 12 pages.
Examination Report dated Oct. 12, 2015 for ARIPO Application No. AP/P/2014/007430, 6 pages.

* cited by examiner

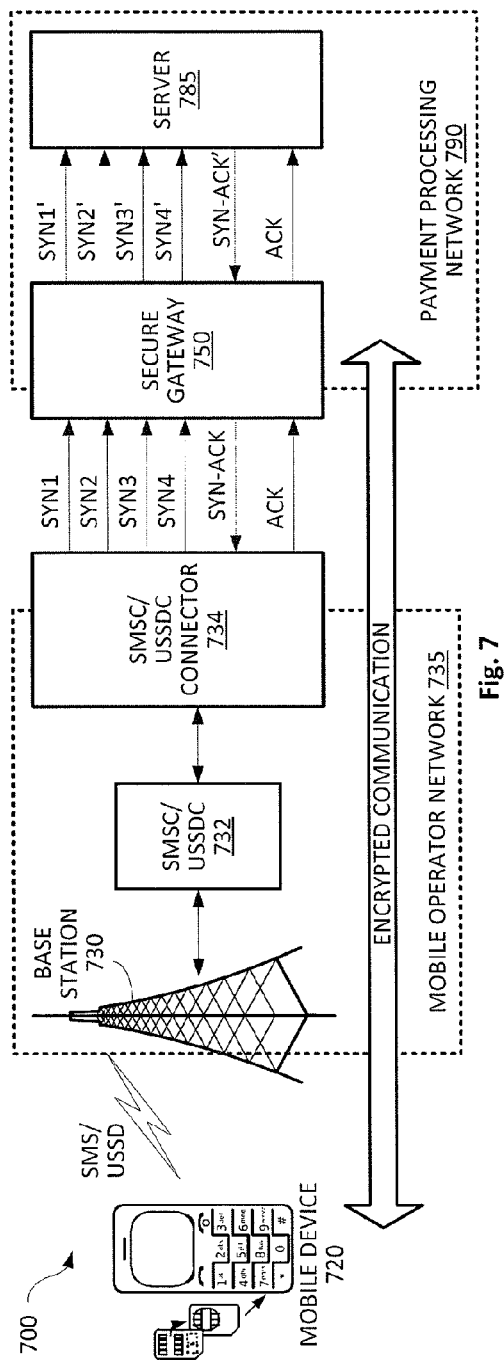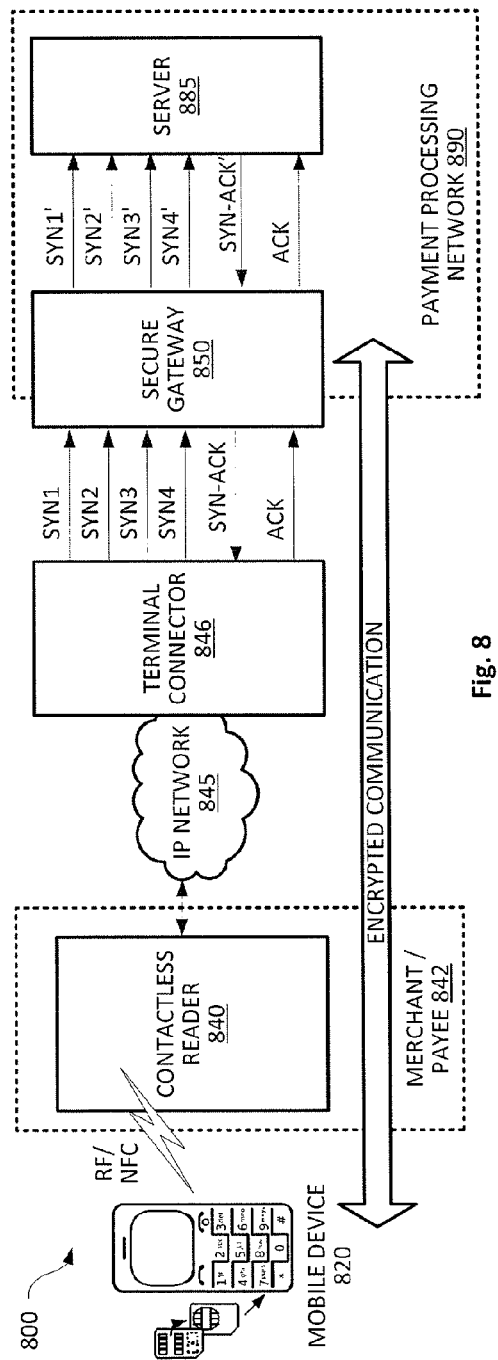

MOBILE BANKING SYSTEM WITH CRYPTOGRAPHIC EXPANSION DEVICE

CROSS-REFERENCES TO RELATED APPLICATIONS

This application is a 371 of international application No. PCT/US2012/047645 filed Jul. 20, 2012, which is a non-provisional of and claims the benefit of the filing date of U.S. Provisional Patent Application No. 61/510,023, filed Jul. 20, 2011, the contents of which are all hereby incorporated in their entirety by reference for all purposes.

This application is related to commonly owned Patent Cooperation Treaty (PCT) App. No. PCT/US2012/047693 entitled "Cryptographic Expansion Device and Related Protocols," filed Jul. 20, 2012, the contents of which is hereby incorporated in its entirety by reference for all purposes. This application is also related to commonly owned Patent Cooperation Treaty (PCT) App. No. PCT/US2012/047687 entitled "Security Gateway Communication," filed Jul. 20, 2012, the contents of which is hereby incorporated in its entirety by reference for all purposes.

BACKGROUND

In developing countries and rural areas, less than 10% of the population may have access to banking services from traditional brick-and-mortar banks. In such areas, a bank may be physically located too far away for a majority of the population to travel to. And even if a bank is nearby, it may be the only bank location in the vicinity of a vast region covering a large number of the population. The brick-and-mortar bank may not have the resources and capacity to adequately support such a large number of customers, resulting in long wait times and inconvenience for the bank's customers. In most developing countries, building additional bank branches and/or installing automated teller machines (ATMs) at various locations are often not a viable solution due to the high costs of the complex infrastructure involved. Even in developed countries where there are more bank branches and ATM locations available, customers may still have limited access to banking services such as services that are not available from ATMs during non-business hours. Furthermore, certain customers such as the elderly or customers with disabilities may still have difficulty getting to the bank branches or ATM locations.

In recent years, the use of mobile devices in developed and developing countries has grown rapidly. As such, one way of providing access to banking services is to enable users of mobile devices to perform mobile banking transactions, such as making mobile payments or money transfers, or checking account balances or performing other account related services, directly from their mobile devices. However, security concerns are often a stumbling block that hinders the wide adoption and growth of mobile banking. Most mobile devices lack the capability to securely send end-to-end encrypted communication. As a result, sensitive information, such as a Personal Identification Numbers (PINs) and Primary Account Numbers (PANs), might be sent in plaintext form, creating a vulnerability in which such sensitive information can be intercepted by malicious parties and be used for fraudulent purposes.

Furthermore, the security vulnerability with mobile banking is not just limited to the potential interception of over the air communications. The interface between a mobile operating network and a payment processing network can also be susceptible to infiltration by malicious parties because the security protocols employed by the two networks are often different, and the identities of the network devices on one network may not always be known to the devices on the other network. As a result, malicious parties can attempt to connect to one network at the interface by pretending to be a device of the other network.

Without a secure, efficient, and cost-way to send and receive communications with mobile devices, mobile banking operators are destined to incur losses or fail to roll out their mobile banking services entirely.

Embodiments of the present invention address these and other problems individually and collectively.

BRIEF SUMMARY

Embodiments of the present invention disclose a mobile banking system that uses a cryptographic expansion device attached to a communication component of a mobile device and a secure gateway device to enable end-to-end secure communications between the mobile device and a payment processing network. The cryptographic expansion device enables the mobile device to perform cryptographic operations on communications sent to and from the mobile device. The secure gateway device prevents unauthorized accesses to the payment processing network.

According to at least one embodiment, a mobile banking transaction is conducted in the mobile banking system using a mobile device. A user request to conduct the mobile banking transaction is received at the mobile device. In response, the mobile device generates a transaction request message. The transaction request message is encrypted using a cryptographic expansion device attached to a communication component of the mobile device. The transaction request message is then sent to a secure gateway device, which then forwards the transaction request message to a server for processing.

According to at least one embodiment, a transaction request message originating from a mobile device is received at a secure gateway device on a secure communication channel for conducting a mobile banking transaction. The transaction request message is encrypted by a cryptographic expansion device attached to a communication component of the mobile device. Upon receiving the transaction request message, the secure gateway device decrypts the transaction request message. The transaction request message is then forwarded to a server for processing.

According to at least one embodiment, a mobile banking system includes a cryptographic expansion device and a secure gateway device communicatively coupled to the mobile device. The cryptographic expansion device includes a hardware security module (HSM) to encrypt a transaction request message being sent from a mobile device to conduct a mobile banking transaction. The cryptographic expansion device is in the form of a label that is attached to a communication component of the mobile device. The secure gateway device is to receive and forward the transaction request message to a server for processing. The secure gateway device includes an access control module to establish a secure communication channel to the mobile device using a predetermined sequence of network messages, and a cryptographic module to decrypt the transaction request message originating from the mobile device.

BRIEF DESCRIPTION OF THE DRAWINGS

FIG. 7 illustrates a mobile banking system, according to an exemplary embodiment of the present invention.

FIG. 8 illustrates a mobile banking system, according to another exemplary embodiment of the present invention.

DETAILED DESCRIPTION

Figure 1:
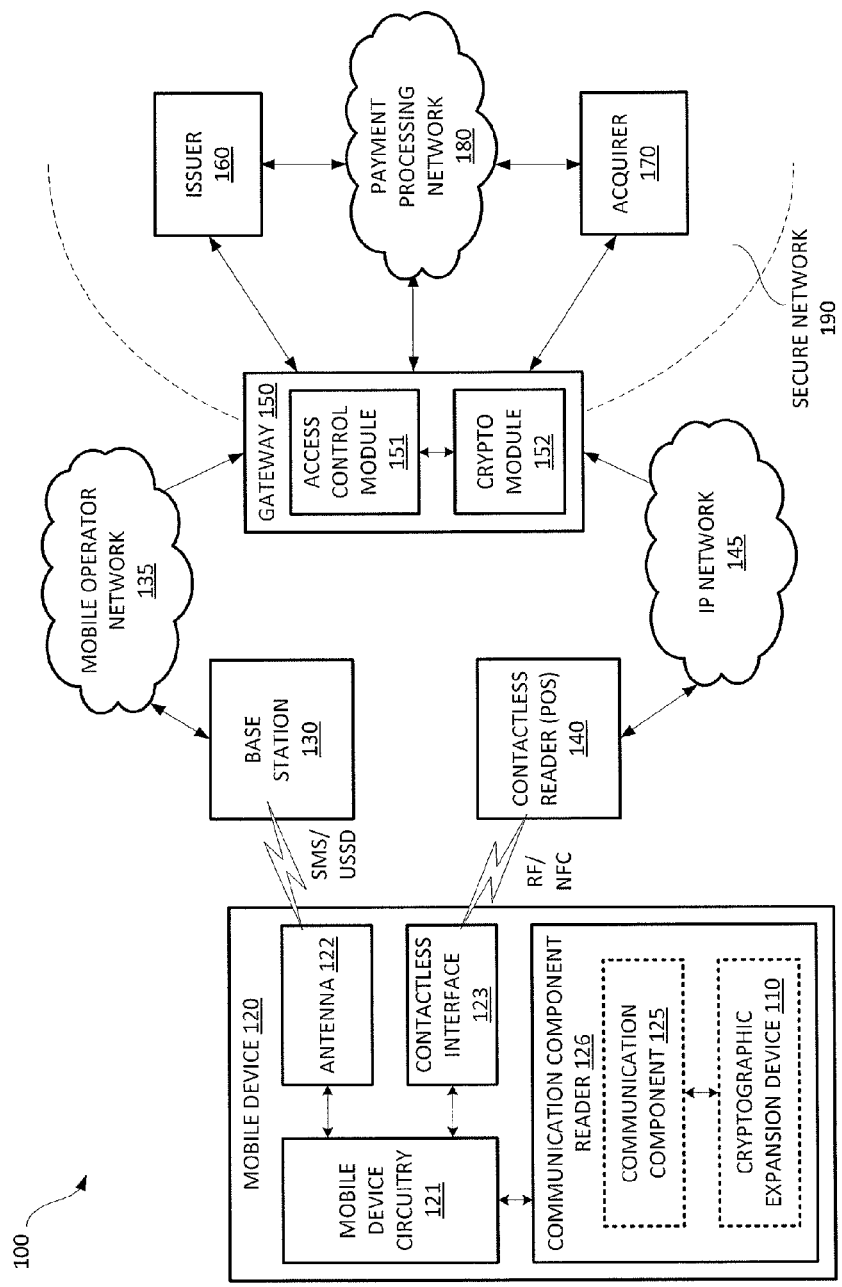
FIG. 1 illustrates a mobile banking system, according to various embodiments of the invention.

Embodiments of the present invention disclose a mobile banking system that uses a cryptographic expansion device attached to a communication component of a mobile device and a secure gateway device to enable end-to-end secure communications between the mobile device and a payment processing network. On the mobile device end, the cryptographic expansion device enables the mobile device to perform cryptographic operations on communications sent to and from the mobile device. The cryptographic expansion device includes embedded processors and storage capabilities that can be used to implement a Federal Information Processing Standards (FIPS) compliant hardware security module (HSM) to provide the mobile device with the set of security features and functions as found in industry-standard HSMs. When used with a mobile device, the cryptographic expansion device enables mobile network operators to utilize their otherwise unsecure secure communication channels to send and receive encrypted communications. Furthermore, the cryptographic expansion device according to various embodiments can be used with a mobile device without requiring any changes to the internal software or hardware of the mobile device and without requiring any modification to the communication protocols of the mobile device. Thus, the cryptographic expansion device according to embodiments of the invention can be widely deployed in a cost-effective and efficient way to promote the use and acceptance of mobile banking services.

It should be appreciated that the cryptographic expansion device according to embodiments of the invention uses dedicated cryptographic hardware components provided in the cryptographic expansion device to perform cryptographic operations. This is different from software encryption technologies that use software with a general purpose processor to perform encryption, and provides enhanced security protection over such software encryption technologies. In some embodiments, the cryptographic expansion device is implemented as a dual processing units device that includes a FIPS compliant secure processing unit and a public processing unit. This division in hardware roles introduces an additional level of security by providing a physical and logical separation between interfaces that are used to communicate critical security parameters and other interfaces that are used to communicate other data. Furthermore, the cryptographic expansion device can also provide a tamper-resistant mechanism that provides a high risk of destroying components in the cryptographic expansion device and the cryptographic keys stored therein, if any attempt is made to remove or externally access the cryptographic expansion device.

On the network interface end, a secure gateway device of the payment processing network prevents unauthorized network devices from connecting to the payment processing network by not responding to single individual network messages sent to the secure gateway device unless a predetermined sequence of network messages that is only known to the secure gateway device and authorized network devices is received. Because the secure gateway device will not respond to random messages and the likelihood that an unauthorized device can correctly guess the predetermined sequence of the network messages is low, the risk of a malicious party being able to hack into the payment processing network, for example, by using port scanning techniques, can be mitigated. When a secure communication channel is established with an authorized network device of the mobile operator network using the predetermined sequence of network messages, the secure gateway device can receive user messages originating from a mobile device that have been encrypted by the cryptographic expansion device, and decrypt the user messages that can be used to conduct mobile banking transactions.

As used herein, an "issuer" can be any bank that issues and maintains a financial account for a user such as a consumer. An "acquirer" can be any bank that provides and maintains a financial account for a merchant or a payee of a payment. A "payment processing network" may include data processing subsystems, networks, and operations used to support and deliver authorization services, exception file services, and clearing and settlement services.

"Account information" may include a numerical or alpha-numerical values such as a Primary Account Number (PAN) associated with a financial account such as a banking account or credit card account of a consumer (e.g., a user of a mobile device) issued by an issuer. Account information may also refer to a numerical or alpha-numerical values associated with portable consumer payment device (e.g., debit/credit card) of the user. Account information can also be a Personal Identification Number (PIN) that is associated with a financial account. Account information may be used to look up a financial account of a user, generate a request to withdraw funds, purchase goods or services, and perform other types of financial transaction. If payment card is associated with a financial account, the account information may include card data such as an account number associated with the card, and expiration date associated with the card, verification values associated with the card, etc. Account information may include other information that can be used to identify a financial account of a user.

A "mobile banking transaction" is a banking transaction that is conducted through the use of a mobile device. A mobile banking transaction can be an account inquiry that does not involve a payment such as checking account balance, checking credit limit, looking up transaction history, etc., or a mobile banking transaction can be a payment transaction such as a mobile payment, a mobile purchase, a mobile money transfer, etc.

As used herein, a "message" is a communication sent from a sender device to a recipient device. A message can be a "network message" that is used by network devices to establish a communication channel or a connection with each other, or to communicate network information between network devices. A "client message" is a network message that is sent between a gateway device of a host network and a client device of a network external to the host network. A "server message" is a network message that is sent between a gateway device of a host network and a host device such as a server of the host network. A "network message" is not used to communicate user information or user data, and hence is different than a "user message" which is used to communicate user information or user data.

A "user message" is a communication that is used to communicate user information or user data such as account information of a user. A user message can be sent to or from a user device (e.g., a mobile device such as a mobile phone, etc.). A user message can be a "transaction request message" that originates from a user device to initiate a mobile banking transaction. A transaction request message can include a transaction identifier identifying the type of transaction (e.g., account inquiry, payment, etc.), account information (e.g., account information of a user and/or a merchant or payee, etc.), transaction information (e.g., transaction amount, time of transaction, location, etc.), device and/or user information (e.g., mobile phone number, mobile device identifier, mobile subscriber information), and/or other types of information that is used for conducting a mobile banking transaction. A user message can be a "transaction response message" that is sent to a user device to indicate the result or outcome of a mobile banking transaction. A "transaction response message" can include any of the information that is included in a transaction request message, and can also include requested account information responsive to an account inquiry, and/or confirmation or denial of a payment or other types of transaction.

As used herein, the term "secure communication" refers to a communication that includes at least some portion of the communication that is sent or received in an encrypted format. The term "secure operation" refers to a process or a function that involves performing one or more cryptographic operation. Examples of a "secure operation" can include sending or receiving of a secure or encrypted communication, or performing a financial or banking transaction with encrypted data. The term "cryptographic operation" refers to any of encryption, decryption, MAC generation or verification, hash generation or verification, and/or any of the functions provided by the cryptographic expansion device as described herein. The term "non-secure communication" refers to a communication that is sent or received in plaintext form. The term "non-secure operation" refers to a process or a function that does not involve performing a secure operation.

FIG. 1 illustrates a mobile banking system 100 according to various embodiments. For simplicity of discussion, only one of each device is shown. It should be understood that embodiments of the technology may include more than one of each device. Additionally, some embodiments may include fewer than all of the devices shown in FIG. 1. Furthermore, the devices in FIG. 1 may communicate via any suitable communication medium (including the Internet), using any suitable communication protocol.

The mobile banking system 100 includes a mobile device 120 that can communicate with a base station 130 associated with a mobile operator (e.g., cellular or wireless provider) providing cellular or wireless service to mobile device 120, and a secure gateway device 150 that interfaces between a secure network 190 and external networks. Secure network 190 is a network that implements a high level of security standards for data transmission and storage such as those in compliance with Payment Card Industry (PCI) security standards. Secure network 190 can include or be part of a payment processing network 180, and includes an issuer 160 associated with a financial account (e.g., a bank account, or credit card account) of a user of mobile device 120, and an acquirer 170 associated with a merchant or a payee.

Payment processing network 180 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. Furthermore, the payment processing network 180 may include one or more servers and may use any suitable wired or wireless network, including the Internet.

Base station 130 can relay communications between mobile device 120 and secure gateway device 150 through a mobile operator network 135. Theses communications can include Short Message Service (SMS) and/or Unstructured Supplementary Service Data (USSD) messages and/or other types of communications (e.g., voice, data) that are supported by the mobile operator between mobile device 120 and secure gateway device 150 through a mobile operator network 135. Mobile operator network 135 may include any number of network entities and network devices that can provide both wired and wireless connectivity to exchange communications between base station 130 and secure gateway device 150. For example, mobile operator network 135 may include a Short Message Service Center (SMSC) to process SMS messages from mobile device 120, and relays the SMS messages to secure gateway device 150 through a SMSC connector network device.

In some embodiments, mobile device 120 can also communicate with a contactless reader 140 associated with a merchant or a payee via radio frequency (RF) and/or Near Field Communication (NFC) communications. Contactless reader 140 can be, for example, a RF/NFC enabled point-of-sale (POS) terminal at a merchant, or other types of RF/NFC enabled payment devices such as another mobile device, a portable computing device such as a tablet computer or a laptop, or a RF/NFC payment adaptor attached to a computing device. Contactless reader 140 can communicate with secure gateway device 150 through a communication network such as an internet protocol (IP) network 145. IP network 145 may include any number of network devices that can provide both wired and wireless connectivity to exchange communications between contactless reader 140 and secure gateway device 150. For example, IP network 145 may include any number of routers and/or repeaters. IP network 145 may also include gateway devices of IP network 145 that interfaces IP network 145 to other networks such as secure network 190. In embodiments in which contactless reader 140 is another mobile device, contactless reader 140 may communicate with secure gateway device 150 through a cellular or wireless network such as mobile operator network 135.

According to embodiments of the invention, secure gateway device 150 can prevent unauthorized access to secure network 190 from unauthorized devices on external networks such as mobile operator network 135 and/or IP network 145. Secure gateway device 150 can communicate with a server of issuer 160 or a server of acquirer 170 through payment processing network 180. In some embodiments, secure gateway device 150 can communicate directly with a server of issuer 160, bypassing payment processing network 180. In other embodiments, it may also be possible for secure gateway device 150 to bypass payment processing network 180 to communicate directly with a server of acquirer 170.

Secure gateway device 150 includes an access control module 151 and a cryptographic module 152. Access control module 151 includes a set of access rules that can be used to determine which devices of an external network is authorized to communicate with secure network 190, and can establish secure communication channels through mobile operator network 135 and/or IP network 145 to send and receive encrypted messages with user devices such as mobile device 120. Cryptographic module 152 can perform cryptographic operations such as encryption and decryption operations on user messages sent to and from mobile device 120. In some embodiments, cryptographic module 152 can also re-zone or re-encrypt user messages from external networks before forwarding the user messages onto secure network 190, for example, to conform user messages from external networks to the security protocols of secure network 190.

Mobile device 120 can be any form of portable communication device that can send and receive SMS and/or USSD messages or other types of communications with a cellular communication system such as Global System for Mobile communications (GSM). For example, mobile device 120 can be a cellular or wireless phone, a smartphone, a tablet computer, a personal digital assistance (PDA), a pager, a portable computer, or the like. Mobile device 120 includes mobile device circuitry 121, a communication component reader 126, an antenna 122, and in some embodiments, a contactless interface 123. Mobile device circuitry 121 includes any suitable hardware and/or software to carry out the functionalities of mobile device 120, such as a user interface (display, touchscreen, buttons, speaker, microphone, etc.) to interact with a user of mobile device 120, and one or more processors coupled to machine readable storage medium that stores machine executable code that can be executed by the processor to perform the functionalities of mobile device 120. Antenna 122 is used by mobile device circuitry 121 to send and receive cellular communications such as SMS, USSD, and/or other types of communications (e.g., voice, data) with base station 130. Contactless interface 123 is used by mobile device circuitry 121 to send and receive RF and/or NFC communications with contactless reader 140.

Communication component reader 126 can be a communication card reader such as a SIM card reader that can read and write information and access application programs on a communication component 125. Communication component 125 can be a user-removable communication component such as a communication card (e.g., a SIM card), or other types of user-removable communication component of a mobile device such as a memory card that stores information and/or application programs that mobile device 120 can use to send and receive communications.

According to embodiments of the invention, a cryptographic expansion device 110 can be attached to communication component 125 of mobile device 120 to enable the mobile device to perform cryptographic operations on communications sent to and from the mobile device. Cryptographic expansion device 110 includes embedded processors and storage capabilities that can be used to implement a Federal Information Processing Standards (FIPS) compliant hardware security module (HSM) to provide mobile device 120 with the set of security features and functions as found in industry-standard HSMs. When used with mobile device 120, cryptographic expansion device 110 enables mobile device 120 to send and received end-to-end encrypted communications with secure gateway device 150, which can include user messages that are used to conduct mobile banking transactions in a secure manner.

Figure 2:
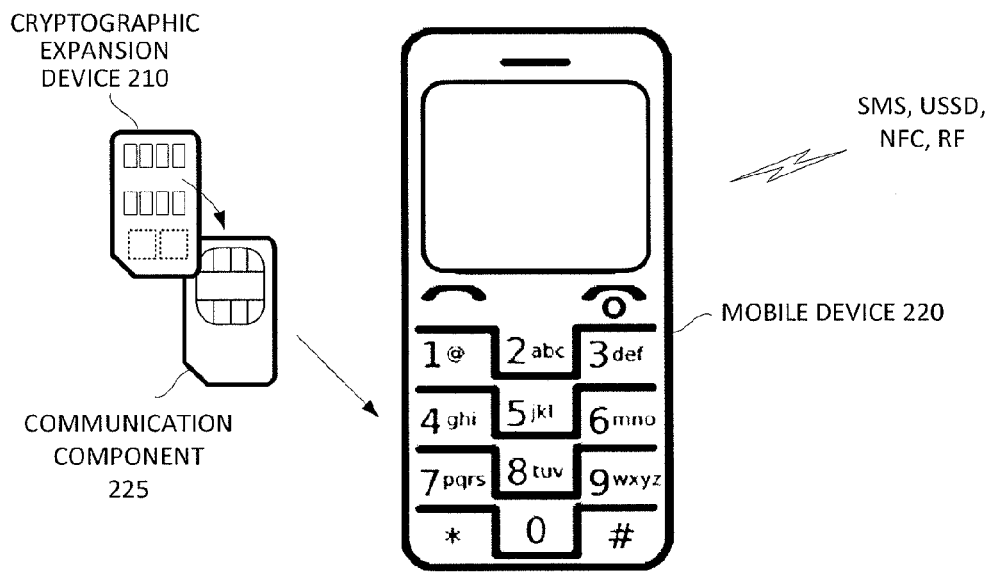
FIG. 2 illustrates a mobile device, according to one embodiment of the present invention.

FIG. 2 illustrates a mobile device 220 for sending and receiving encrypted communications according to an exemplary embodiment. Mobile device 220 includes a cryptographic expansion device 210 attached to a user-removable communication component 225 installed in mobile device 220. In the exemplary embodiment as shown, the cryptographic expansion device 210 is in the form of a label, the communication component 225 is a SIM card, and the mobile device 220 is a mobile phone. It should be understood that in other embodiments, mobile device 220 can be other types of portable communication device described above, and communication component 225 can be other types of user-removable communication component of a mobile device such as a memory card.

In accordance with embodiments of the present invention, when cryptographic expansion device 210 is attached to communication component 225 and installed in a communication component reader of mobile device 220, cryptographic expansion device 210 can provide and/or expand the capability of mobile device 220 to perform cryptographic operations to send and receive end-to-end secure communications with a recipient device using one or more of the communication interfaces (e.g., antenna 122 and/or contactless interface 123 of FIG. 1) available in mobile device 220. For example, cryptographic expansion device 210 can enable mobile device 220 to send encrypted SMS and/or USSD messages using a cellular interface (e.g., antenna 112 if FIG. 1) of mobile device 220. In some embodiments in which mobile device 220 has a contactless interface, cryptographic expansion device 210 can enable mobile device 220 to send encrypted RF and/or NFC communications using the contactless interface of mobile device 220. Thus, cryptographic expansion device 210 can be used with mobile device 220 to encrypt and decrypt any types of communication that mobile device 220 is capable of sending and receiving.

It should be appreciated that in various embodiments, cryptographic expansion device 210 provides mobile device 220 with the cryptographic capabilities without requiring any modifications to the internal hardware and/or software of mobile device 220 and without requiring any modifications to the internal hardware and/or software of communication component 225. According to various embodiments, communication component 225 can be a standard SIM card that conforms to the ISO/IEC 7810 or ETSI TS 102 221 standards, and cryptographic expansion device 210 can be applied to the surface of communication component 225 without requiring any physical modifications to the communication component 225 itself. For example cryptographic expansion device 210 can be attached to a standard SIM card and be used in a mobile device without requiring the SIM card to be cut or trimmed, and without requiring any holes or openings to be formed in the SIM card. The cryptographic expansion device according to various embodiments will now be described in more details.

Cryptographic Expansion Device

Figure 3:
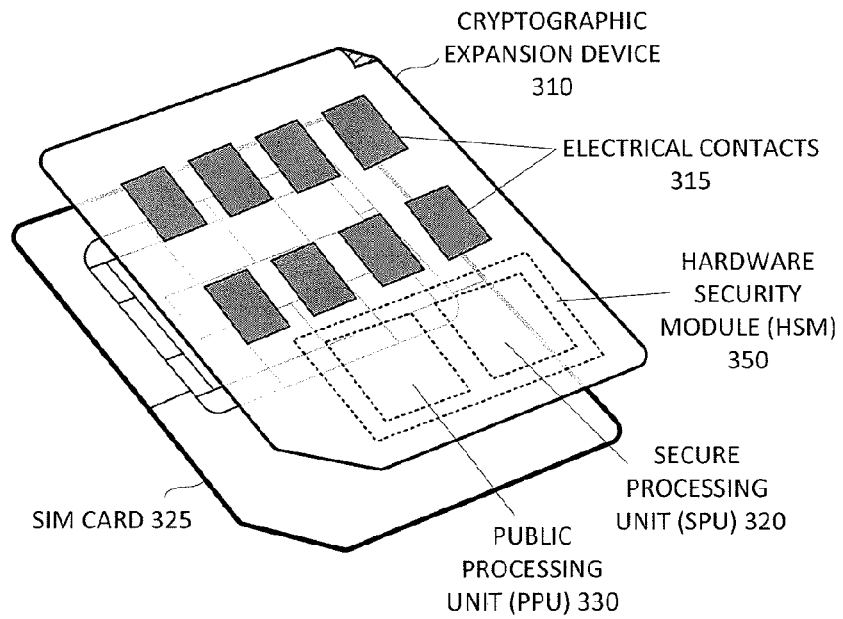
FIG. 3 illustrates a cryptographic expansion device and a communication component of a mobile device, according to one embodiment of the present invention.

According to various embodiments, the cryptographic expansion device is a circuit board with integrated circuits implementing a hardware security module (HSM) disposed therein. The cryptographic expansion device can be a flexible printed circuit board in the form of a label. FIG. 3 illustrates a cryptographic expansion device 310 and a communication component according to one embodiment of the invention. According to the embodiment as shown, the cryptographic expansion device 310 is in the form of a label, and includes one or more integrated circuits implementing a hardware security module (HSM) 350 disposed therein. The communication component that the cryptographic expansion device 310 attaches to is a SIM card 325 (e.g., a mini-SIM card as shown). It should be understood that while the description and explanation provided below are made with reference to a particular embodiment, the description and explanation provided below are applicable to and can be adapted for other embodiments, for example, embodiments in which the cryptographic expansion device is used with a SIM card with a different form factor, or in which the cryptographic expansion device is used with other types of communication component such as a memory card.

It should also be noted that although cryptographic expansion device 310 is shown to be semi-transparent in FIG. 3, cryptographic expansion device 310 is shown as such for illustrative purposes. Thus, in some implementations, cryptographic expansion device 310 can be opaque, and HSM 350 and the underlying SIM card 325 may not be visible from the top of cryptographic expansion device 310.

HSM 350 includes a public processing unit (PPU) 330 which can be implemented with one or more processors or controllers, and a secure processing unit (SPU) 320 which can be implemented with one or more cryptoprocessors. In some embodiments, HSM 350 is a packaged semiconductor chip that includes both SPU 320 and PPU 330 in a single package, but with a logical and physical separation between SPU 320 and PPU 330. In other embodiments, SPU 320 and PPU 330 can be individually packaged semiconductor chips or semiconductor dies that are coupled together in cryptographic expansion device 310 to implement HSM 350.

Cryptographic expansion device 310 includes a coupling element that can be used to attach cryptographic expansion device 310 to SIM card 325. In some embodiments, the coupling element is an adhesive material disposed on the bottom surface of cryptographic expansion device 310. Thus, cryptographic expansion device 310 can be applied to the surface of SIM card 325 similar to an adhesive label or a sticker. In other embodiments, the coupling element can be a mechanical mechanism such as notches provided on cryptographic expansion device 310 or a clip that can be used to physically secure cryptographic expansion device 310 to SIM card 325. In some embodiments, cryptographic expansion device 310 can have a flexible or semi-flexible substrate, for example, to facilitate the application of cryptographic expansion device 310 to the surface of SIM card 325. Cryptographic expansion device 310 can also have a rigid or semi-rigid substrate, for example, to provide stiffness to protect the cryptographic expansion device 310.

According to some embodiments, the adhesive material disposed on the bottom surface of cryptographic expansion device 310 to secure cryptographic expansion device 310 to SIM card 325 can also serve as a tamper-resistant mechanism to provide a high risk of destroying cryptographic expansion device 310 if an attempt is made to remove cryptographic expansion device 310 from SIM card 325 once cryptographic expansion device 310 has been attached to SIM card 325. For example, after cryptographic expansion device 310 has been applied to the surface of SIM card 325, if an attempt is made to remove cryptographic expansion device 310 from SIM card 325 by peeling off cryptographic expansion device 310, the adhesive material may rip apart the contact pads of cryptographic expansion device 310, and/or the interconnects and circuits electrically coupling the components of cryptographic expansion device 310 to render cryptographic expansion device 310 unusable. Alternatively or in addition, the adhesive material may rip apart portions of SIM card 325 to render SIM card 324 unusable as well if an attempt is made to remove cryptographic expansion device 310 from SIM card 325.

According to various embodiments, cryptographic expansion device 310 can have various different form factors. The thickness of cryptographic expansion device 310 is made to be thin enough such that when cryptographic expansion device 310 is attached to SIM card 325, SIM card 325 can still be inserted or removed from a SIM card receiving slot of a communication device such as a mobile phone. In one embodiment, the thickness of cryptographic expansion device 310 is less than 100 microns (um). In other embodiments, the thickness of cryptographic expansion device 310 can be less than 150 um, 200 um, 250 um, or 300 um.

In some embodiments, cryptographic expansion device 310 can have a form factor with planar dimensions (e.g., length and/or width) that are substantially the same as the planar dimensions of SIM card 325 as shown in FIG. 3. One or more planar dimensions of cryptographic expansion device 310 can be within 1%, 2%, 5%, 10%, 15%, or 20% of the corresponding planar dimension of SIM card 325. For example, in a particular embodiment in which the length of SIM card 325 is 25 millimeters (mm) and the length of cryptographic expansion device 310 is within 10% of the length of SIM card 325, the length of cryptographic expansion device 310 can be between 22.5 mm (90% of 25 mm) and 27.5 mm (110% of 25 mm).

In other embodiments, cryptographic expansion device 310 can have a form factor with one or more planar dimensions that is different than the corresponding planar dimension of the communication component with which cryptographic expansion device 310 attaches to, if the size of cryptographic expansion device 310 does not prevent the communication component from being used with a communication device. In other words, referring to the embodiment shown in FIG. 3, the planar dimensions of cryptographic expansion device 310 should allow SIM card 325 attached with cryptographic expansion device 310 to fit into a SIM card receiving slot of a communication device. It should be noted that this does not mean that the planar dimensions of cryptographic expansion device 310 has to be smaller than SIM card 325. For example, in some embodiments, cryptographic expansion device 310 can be longer than SIM card 325 and can extend out of a SIM card receiving slot of a communication device if the communication device can tolerate such a configuration. In other embodiments in which the substrate of cryptographic expansion device 310 is a flexible substrate, when cryptographic expansion device 310 is applied to SIM card 325, the excess portions of cryptographic expansion device 310 that extends over the surface of SIM card 325 can be folded over to wrap around SIM card 325.

Furthermore, in some embodiments, a cryptographic label with a form factor corresponding to one type of SIM card can be used with a SIM card that has a different form factor.

For example, although cryptographic expansion device 310 as shown in FIG. 3 has a form factor with planar dimensions that are substantially the same as a mini-SIM card, cryptographic expansion device 310 can be attached to a standard SIM card instead of a mini-SIM card. Similarly, a cryptographic label having a form factor with planar dimensions that are substantially the same as a micro-SIM card can be attached to a mini-SIM card instead of a micro-SIM card.

Cryptographic expansion device 310 includes a set of electrical contacts 315 disposed on the top side or on the upper surface of cryptographic expansion device 300, and a set of electrical contacts (not shown) disposed on the bottom side or on the bottom surface of cryptographic expansion device 310. The set of electrical contacts 315 on the top side of cryptographic expansion device 310 is used for interfacing cryptographic expansion device 310 to a SIM card reader of a mobile device; that is, to electrically couple cryptographic expansion device 310 to the SIM card reader of a mobile device when SIM card 325 attached with cryptographic expansion device 310 is inserted into a SIM card receiving slot of the mobile device. The set of electrical contacts on the bottom side of cryptographic expansion device 310 is used for interfacing cryptographic expansion device 310 to SIM card 325; that is, to electrically couple cryptographic expansion device 310 to SIM card 325.

Figure 4:
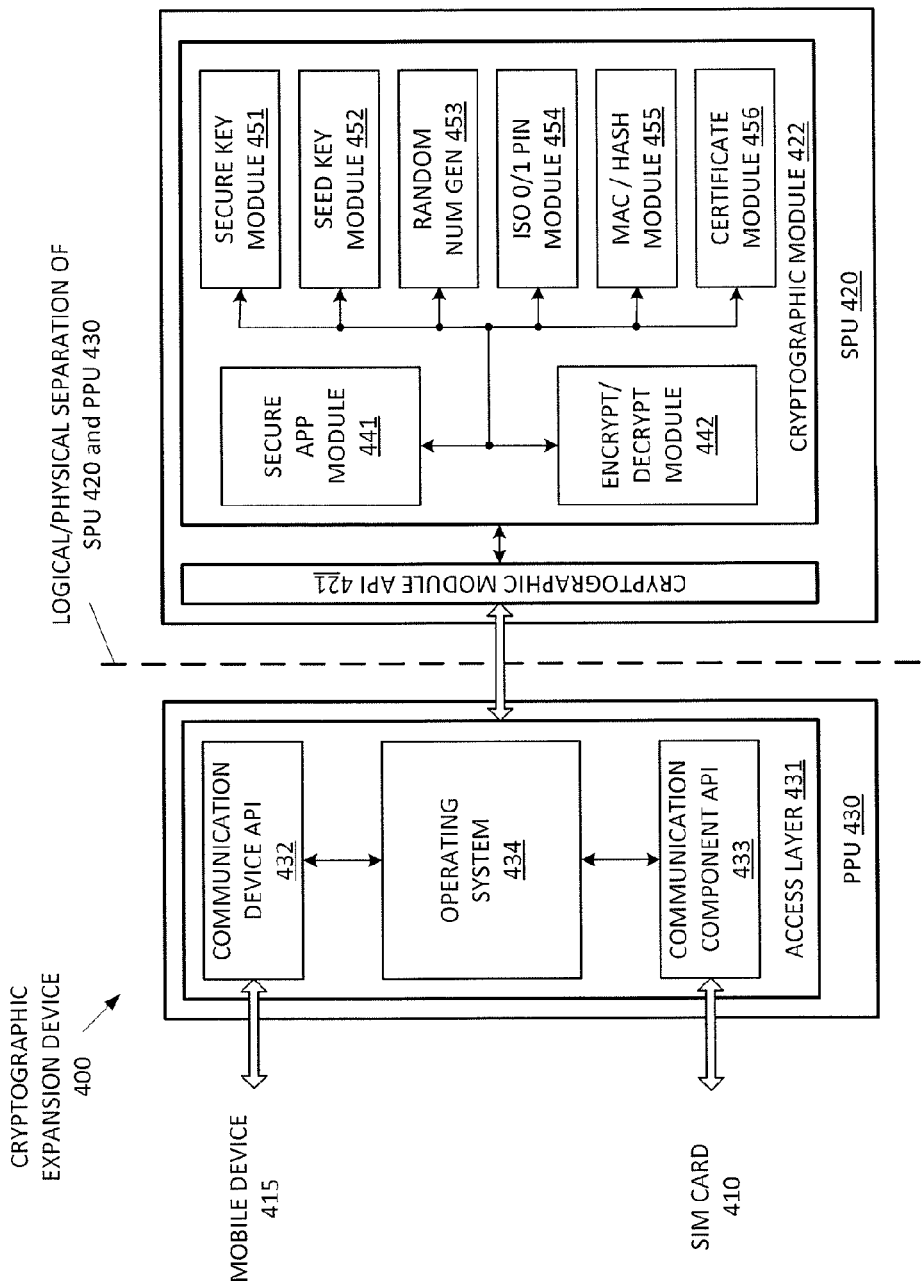
FIG. 4 illustrates a block diagram of a cryptographic expansion device, according to one embodiment of the present invention.

FIG. 4 illustrates the functional modules of a cryptographic expansion device 400, according to one embodiment. When cryptographic expansion device 400 is installed in a SIM card receiving slot of a mobile device, the cryptographic expansion device 400 is sandwiched between mobile device 415 and SIM card 410. Cryptographic expansion device 400 includes a public processing unit (PPU) 430 coupled to a secure processing unit (SPU) 420. It should be noted that although SPU 420 is coupled to PPU 430, cryptographic expansion device 400 provides a logical and/or physical separation between SPU 420 and PPU 430. A "physical separation" refers to some physical boundary between SPU 420 and PPU 430. For example, SPU 420 and PPU 430 can be implemented with and manufactured as separate semiconductor dies or separately packaged semiconductor chips, and the physical boundary of the dies or chips can serve as the physical separation. A "logical separation" refers to the separation of the communication interface and storage memory between SPU 420 and PPU 430. Because of the logical and physical separation between SPU 420 and PPU 430, SPU 420 is exposed to PPU 430 only, and is not accessible by mobile device 415 or by SIM card 410, except through PPU 430. Hence, PPU 430 can serve as a firewall or a gatekeeper to ensure unauthorized or unwanted communications such as hacking attempts are not sent to SPU 420.

PPU 430 of cryptographic expansion device 400 can be implemented with a processor coupled to a memory such as a machine readable storage medium storing machine executable code implementing one or more components of PPU 430. PPU 430 includes an operating system (OS) 434, a communication device application programming interface (API) 432, and a communication component API 433. OS 434, communication device API 432, and communication component API 433 together form an access layer 431, which represents the publicly accessible portion of cryptographic expansion device 400. By "publicly accessible," it is meant that any device or components of mobile device 415 that can communicate directly with SIM card 410, or with a SIM card reader of a mobile device 415 would be able to send and receive commands and information to and from access layer 431.

Communication device API 432 provides a programming interface to translate commands and information received from mobile device 415 into instructions and data that OS 434 can process and execute, and vice versa. For example, communication device API 432 may translate commands from mobile device 415 according to a mobile phone's SIM toolkit protocol into instructions and data that OS 434 can process and execute to respond to the commands, and vice versa. Communication component API 433 provides a programming interface to translate commands and information received from SIM card 410 into instructions and data that OS 434 can process and execute, and vice versa. For example, communication component API 433 may translate commands from SIM card 410 according to the SIM card's SIM toolkit protocol into instructions and data that OS 434 can process and execute to respond to the commands, and vice versa.

OS 434 manages the functionality and operations of cryptographic expansion device 400, and responds to commands and information from mobile device 415 and/or SIM card 410. OS 434 can be complaint with Payment Card Industry (PCI) and International Organization for Standardization (ISO) standards. The functionality and operations of cryptographic expansion device 400 that OS 434 can manage includes responding to user input received on mobile device 415 that relates to cryptographic operations, masking PIN entries on a user interface of mobile device 415, creating ISO PIN blocks in SPU 420, sending encryption and decryption requests to SPU 420 for secure communications sent to and from a communication interface of mobile device 415, sending requests to SPU 420 to create or verify MAC or hash values for messages or portions of messages sent to and from a communication interface of mobile device 415, providing certificates for HTTPS applications, storing encrypted communications history, providing basic encryption to external applications, and managing commands and information exchange through the various interfaces such as passing through commands and information between mobile device 415 to SIM card 410.

For example, in response to encryption and decryption commands received from mobile device 415 on communication device API 432, OS 434 can send encryption and decryption requests and associated data to SPU 420. OS 434 may access and process information stored in SIM card 410 in response to a command to perform as such received from mobile device 415 on communication device API 432. OS 434 can also access information stored in SIM card 410 and forward the information to SPU 420 in response to encryption and decryption commands involving such information. OS 434 can forward encryption and decryption results from SPU 420 to mobile device 415 and/or SIM card 410. OS 434 can also issue commands to mobile device 415 and/or SIM card 410, for example, commands to request mobile device 415 to send a secure communication with data encrypted by SPU 420.

For non-secure commands and information (i.e. commands and information that do not involve cryptographic operations), OS 434 can pass through the non-secure commands and information between mobile device 415 and SIM card 410. For example, in response to non-secure commands and information from mobile device 415 intended for SIM card 410 received on communication device API 432, OS 434 can pass through the non-secure commands and information to SIM card 410 through communication component API 433. In response to non-secure commands and information from SIM card 410 intended for mobile device 415 received on communication component API 433, OS 434 can pass through the non-secure commands and information to mobile device 415 through communication device API 432.

SPU 420 of cryptographic expansion device 400 can be implemented with a cryptoprocessor coupled to a memory such as a machine readable storage medium implementing one or more components of SPU 420. SPU 420 of cryptographic expansion device 400 includes a cryptographic module API 421 and cryptographic module 422. Cryptographic module API 431 provides a programming interface to translate commands and information received from OS 434 into instructions and data that cryptographic module 422 can process and execute, and vice versa. For example, OS 434 may send an encryption/decryption request to SPU 420, and cryptographic module API 431 may translate the encryption/decryption request into an encryption/decryption instruction for cryptographic module 422 to execute. In some embodiments, cryptographic module API 431 may also include, in the translated encryption/decryption instruction, which particular encryption algorithm cryptographic module 422 should use based on the particular application that is requesting the cryptographic operation.

According to various embodiments, cryptographic module 422 includes a secure application module 441, an encryption/decryption module 442, a secure key module 451, a seed key module 452, a random number generator 453, an ISO 0/1 PIN module 454, a MAC/HASH module 455, and a certificate module 456. In other embodiments, cryptographic module 422 may include additional modules to perform other cryptographic operations. Secure application module 441 can store one or more secure applications such as mobile banking applications. Secure application module 441 can process user input selecting a particular function of the secure applications stored therein, and can respond with one or more commands instructing mobile device 415 to perform certain operations, for example, to send an encrypted communication to carry out the user selected function. Secure application module 441 can also instruct encryption/decryption module 442 to perform specific cryptographic operations depending on the user selected function.

Encryption/decryption module 442 can store and execute various encryption algorithms such as Advance Encryption Standard (AES), Data Encryption Standard (DES), Triple Data Encryption Standard/Algorithm (TDES/TDEA), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA), and/or other cryptographic or encryption algorithms. In response to encryption and decryption requests from PPU 430 or from secure application module 441, encryption/decryption module 442 can look up the requested encryption algorithm, obtain any necessary keys from other modules in cryptographic module 422, perform the encryption/decryption request, and respond with the encrypted/decrypted data.

Secure key module 451 stores the set of cryptographic keys (encryption keys and/or decryption keys) that are used in the various encryption algorithms performed by encryption/decryption module 442. The cryptographic keys can include keys of symmetric key pairs or keys of asymmetric key pairs. Seed key module 452 stores a set of seed keys that are used to initialize the encryption/decryption module 442 in certain encryption algorithms such as AES. Seed key module 452 also stores seed keys that are used by random number generator 453 to generate random numbers used in certain encryption algorithms such as RSA and DSA. The cryptographic keys stored in secure key module 451 and/or the seed keys stored in seed key module 452 are provisioned during manufacturing, and cannot be altered by an external source without a master key that was used during manufacturing to program cryptographic module 422. The cryptographic keys and seed keys can also be provisioned to be specific to a particular cryptographic expansion device, and hence the cryptographic keys and seed keys can be user-specific and unique to the user of the cryptographic expansion device 400. One advantage of providing user-specific keys is that if the cryptographic keys stored in cryptographic module 422 are somehow compromised, the infiltration will be isolated to a single user, and the remaining user base of the mobile network will not be compromised. The affected user's keys can be changed without impacting the configuration of the remaining user base.

In some embodiments, cryptographic module 422 includes an ISO PIN module 454 to mask a user's PIN entry into the mobile device 415 and to generate PIN blocks (e.g., ISO format 0/1 PINs) in accordance with ISO 9564 standard. The PIN blocks generated by ISO PIN module 454 stores PINs in an encrypted format that are used to verify a user's identity in banking transactions. The encrypted PINs stored in the PIN blocks of ISO PIN module 454 can be passed from SPU 420 to PPU 430 to be included in secure communications sent from mobile device 415. It should be noted that the PINs stored in ISO PIN module 454 are never stored in plaintext form, but are instead stored in an encryption format.

Cryptographic module 422 also include Message Authentication Code (MAC)/Hash module 455 to generate and verify MACs and/or hashes for secure communications sent to and from mobile device 415. A MAC or a hash can be generated for a message or a portion of the message such that the recipient can verify the message's data integrity and authenticity. Cryptographic module 422 can also include a certificate module to provide certificates such as Transport Layer Security (TLS) and Secure Sockets Layer (SSL) certificates used to verify a user's identity in Hypertext Transfer Protocol Secure (HTTPS) applications such as web applications accessed on a web browser of mobile device 415.

In some embodiments, SPU 420 may also include tamper detection sensors (not shown) to detect external attempts to tamper with cryptographic expansion device 400. For example, tamper detection sensors may include temperature sensors to detect temperatures that may be indicative of someone attempting to desolder components of cryptographic expansion device 400, and/or mechanical sensors to sense structural changes to cryptographic expansion device 400 that may be indicative of someone attempting to dissect or cut open cryptographic expansion device 400. Tamper detection sensors may also include electrical sensors to sense certain voltage, current, or impedance changes to the circuitry of cryptographic expansion device 400 that may be indicative of someone attempting to probe the components of cryptographic expansion device 400, and/or electromagnetic sensors to sense certain radiation such as X-rays that may be indicative of someone attempting to examine cryptographic expansion device 400. In some embodiments, tamper detection sensors may include circuitry that can erase and whip out the contents of the memory of SPU 420 to render SPU 420 and/or cryptographic expansion device 400 unusable in response to detecting an attempt to tamper with cryptographic expansion device 400. Cryptographic expansion device 400 can also be configured with organic or soluble interconnects that can be dissolved by a solvent released by tamper detection sensors 470 in response to detecting an attempt to tamper with cryptographic expansion device 400.

Thus, a cryptographic expansion device that can be attached to a communication component of a mobile device to enable the mobile device to send and received encrypted secure communications on one end of a secure communication has been described. A secure gateway device on the other end of a secure communication according to various embodiments will now be described in more details.

Secure Gateway Device

Figure 5:
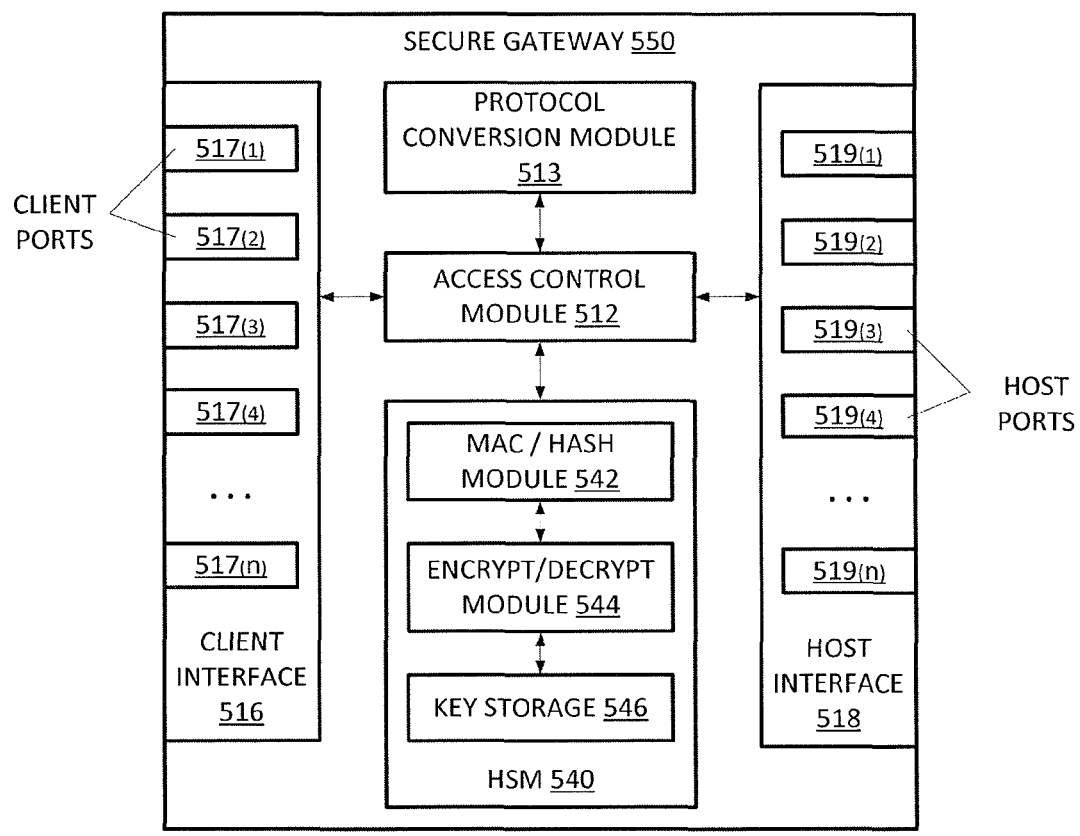
FIG. 5 illustrates a block diagram of a secure gateway device, according to one embodiment of the present invention.

FIG. 5 illustrates a secure gateway device 550 according to various embodiments of the present invention. Secure gateway device 550 includes an access control module 512 (e.g., access control module 151 of FIG. 1), a client interface 516 that interfaces to an external network such as mobile operator network 135 or IP network 145, and a host interface 518 that interfaces to a host network of secure gateway device 550, such as secure network 190. Secure gateway device 550 can also include a protocol conversion module 513 and a hardware security module (HSM) 540 implementing a cryptographic module (e.g., cryptographic module 152 of FIG. 1). Secure gateway device 550 can include one or more processors coupled to a memory such as machine readable storage medium storing machine executable code to implement one or more components of secure gateway device 550, for example, access control module 512 and/or protocol conversion module 513.

Client interface 516 includes multiple client ports $517_{(1)}$-$517_{(n)}$. It should be noted that client ports $517_{(1)}$-$517_{(n)}$ are logical ports, and client interface 516 can be configured with any number of client ports $517_{(1)}$-$517_{(n)}$. Each of client ports $517_{(1)}$-$517_{(n)}$ are associated with a port number on client interface 516, and each client port can be used to send and receive network messages to and from a client device communicatively coupled client interface 516.

Host interface 518 includes multiple host ports $519_{(1)}$-$519_{(n)}$. It should be noted host ports $519_{(1)}$-$519_{(n)}$ are logical ports, and host interface 518 can be configured with any number of host ports $519_{(1)}$-$519_{(n)}$. Each of host ports $519_{(1)}$-$519_{(n)}$ are associated with a port number on host interface 518, and each host port can be to send and receive network messages to and from a device of a host network that is communicatively coupled to host interface 517. It should be understood that in some embodiments, client interface 516 with client ports $517_{(1)}$-$517_{(n)}$ and host interface 518 with host ports $519_{(1)}$-$519_{(n)}$ can be implemented on the same physical interface.

Access control module 512 establishes, controls, and manages secure communication channels between a client device (e.g., a network device of mobile operator network 135 or IP network 145 that is communicatively coupled to mobile device 120 of FIG. 1) coupled to client interface 216 and a host device (e.g., a server of payment processing network 180 or issuer 160 or acquirer 170 of FIG. 1) coupled to host interface 518. Access control module 512 can establish a connection between a client port and a host port through secure gateway device 550 to implement a secure communication channel between a client device and a host device. Access control module 512 includes a set of access rules stored therein that specifies which client devices of an external network is authorized to communicate with which host devices of the host network of secure gateway device 550. The set of access rules can also specify what type of traffic (i.e. communication protocol) that each secure communication channel being established through secure gateway device 550 can carry or support.

According to embodiments of the invention, the set of access rules include predetermined sequences of network messages that secure gateway device 550 can use to authenticate client devices communicatively coupled to client interface 516 to determine if a client device is an authorized client device that is allowed to communicate with a host device. A predetermined sequence of network messages can be specific to a client device, a type of client device, a group of client devices, or a client network. In other words, there can be a predetermined sequence of network messages per client device, per type of client device, per group of client devices, or per client network. A predetermined sequence of network message can be a predetermined sequence of network messages that secure gateway device 550 expects to receive from an authorized client device before the client device is authenticated and allowed to communicate with a host device, or can be a predetermined sequence of network messages that secure gateway device 550 sends out and expects an authorized client device to ignore until secure gateway device 550 has finished sending the entire predetermined sequence of network messages, or can be a combination of both.

For example, if a sequence of network messages received on client interface 516 from a client device of an external network matches the predetermined sequence of network messages as specified for that client device in the access rules, then that client device can be authenticated and be determined to be an authorized client device. Access control module 512 can then establish a secure communication channel between that client device and a host device on the host network through secure gateway device 550. If the sequence of network messages received on client interface 516 does not match the predetermined sequence of network messages as specified in the access rules, then that client device can be determined to be an unauthorized client device, and access control module 512 can refuse to establish a secure communication channel for that client device, and deny that client device's access to the host network.

Alternatively or additionally, if secure gateway device 550 sends a predetermined sequence of network messages to a client device, and the client device does not respond to the network messages until secure gateway device 550 has finished sending the entire predetermined sequence of network messages to that client device, then that client device can be authenticated and be determined to be an authorized client device. Access control module 512 can then establish a secure communication channel between that client device and a host device on the host network through secure gateway device 550. If that client device responds to a network message from secure gateway device 550 before secure gateway device 550 has finished sending the entire predetermined sequence of network messages, then that client device can be determined to be an unauthorized client device, and access control module 512 can refuse to establish a secure communication channel for that client device, and deny that client device's access to the host network.

The set of access rules can also include predetermined sequences of network messages that secure gateway device 550 can use to authenticate host devices communicatively coupled to host interface 218 to determine if a host device is an authorized host device that is allowed to receive network messages from and communicate with a client device. A predetermined sequence of network messages can be specific to a host device, a type of host device, or a group of host devices of the host network. In other words, there can be a predetermined sequence of network messages per host device, per type of host device, or per group of host devices.

A predetermined sequence of network messages can be a predetermined sequence of network messages that secure gateway device 550 expects to receive from an authorized host device before the host device is allowed to communicate with a client device, or can be a predetermined sequence of network messages that secure gateway device 550 sends out and expects an authorized host device to ignore until secure gateway device 550 has finished sending the entire predetermined sequence of network messages, or can be a combination of both.

For example, if a sequence of network messages received on host interface 518 from a host device of the host network matches the predetermined sequence of network messages as specified for that host device in the access rules, then that host device can be determined to be an authorized host device that is allowed to communicate with a client device. Access control module 512 can then establish a secure communication channel between that host device and a client device through secure gateway device 550. If the sequence of network messages received on host interface 516 does not match the predetermined sequence of network messages as specified in the access rules, then that host device can be determined to be an unauthorized host device that is not allowed to communicate with a client device, and access control module 512 can refuse to establish a secure communication channel between that host device and a client device.

Alternatively or additionally, if secure gateway device 550 sends a predetermined sequence of network messages to a host device, and the host device does not respond to the network messages until secure gateway device 550 has finished sending the entire predetermined sequence of network messages to that host device, then that host device can be determined to be an authorized host device that can communicate with a client device. Access control module 512 can then establish a secure communication channel between that host device and a client device through secure gateway device 550. If that host device responds to a network message from secure gateway device 550 before secure gateway device 550 has finished sending the entire predetermined sequence of network messages, then that host device can be determined to be an unauthorized host device that is not allowed to communicate with a client device, and access control module 512 can refuse to establish a secure communication channel between that host device and a client device.

Each of the predetermined sequences of network messages in the access rules can be defined by the message contents of the network messages. For example, each predetermined sequence of network messages can include one or more network messages with a particular source and/or destination identifiers as indicated in the header fields in the header of each network message, and/or network messages of one or more types (e.g., synchronize messages, synchronize-acknowledgment messages, and/or acknowledge messages, etc.) as indicated by flags in the header of each network message, and/or network messages with a particular payload or data pattern.

Each of the predetermined sequences of network messages can also be defined by the timing of the network messages; that is, each predetermined sequence of network messages can have timing restrictions as to when each network message is received or sent relative to the other network messages. For example, a predetermined sequence of network messages can be a sequence of network messages in which the last network message is received within a time period of receiving the first network message (e.g., entire sequence of network messages received within 2 seconds). A predetermined sequence of network messages can be a sequence of network messages in which the each network message is received within a time interval (e.g., a network message every 200 milliseconds), or each network message is received within a specific time period after the previous network message (e.g., second network message received within 100 milliseconds from the first network message, third network message received within 50 milliseconds of second network message, etc.). A predetermined sequence of network messages can also be a sequence of network messages in which the secure gateway device expects an authorized device to ignore for a time period (e.g., client device should not respond until 2 seconds after receiving the last network message).

Furthermore, each of the predetermined sequences of network messages can be defined by a combination of message contents and timing, and each predetermined sequence of network messages can have a different message content and/or differing timing than the other predetermined sequences of network messages.

Secure gateway device 550 can also include protocol conversion module 513 that stores information about any number of communication protocols that secure gateway device can support, as well as the security protocols of external networks and the host network of secure gateway device 550. Protocol conversion module 513 can be used with access control module 512 to convert user messages (e.g., transaction request messages or transaction response messages used for mobile banking transactions) sent on secure communication channels between client interface 516 and host interface 518 from one communication protocol to another communication protocol to provide interoperability between client devices of an external network and host devices of the host network of secure gateway device 550.

Protocol conversion module 513 can also be used in conjunction with access control module 512 and HSM 240 to implement security protocols to adapt user messages from an external network to conform to the security protocols of the host network of secure gateway device 550. For example, in some embodiments, the security protocol of the host network may specify that all user messages being transmitted in the host network are to be protected by message authentication codes and/or hash codes. Protocol conversion module 513 can be used in conjunction with access control module 512 and HSM 540 to generate message authentication codes and/or hash codes, and to append them to user messages received from an external network if user messages from the external network lack message authentication codes and/or hash codes.

In some embodiments, secure gateway device 550 also includes a Federal Information Processing Standards (FIPS) compliant HSM 540. HSM 540 can include one or more cryptoprocessors and memory such as machine readable storage medium storing machine executable code implementing an encryption/decryption module 544, a message authentication code/hash module 542, and a cryptographic key storage 546. HSM 540 provides secure key management related functions such as cryptographic key generation, configuration of security limits and capabilities of the cryptographic keys, cryptographic keys backup and recovery, secure cryptographic keys storage, and revocation and destruction of cryptographic keys. HSM 540 can also provide a tamper-resistant mechanism that provides a high risk of destroying components in HSM 540 and the cryptographic keys stored therein, if any attempt external to secure gateway 550 is made to access or tamper with HSM 540.

Encryption/decryption module 544 can store and execute various encryption algorithms such as Advance Encryption Standard (AES), Data Encryption Standard (DES), Triple Data Encryption Standard/Algorithm (TDES/TDEA), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA), and/or other cryptographic or encryption algorithms. In response to encryption and decryption requests from access control module 512, encryption/decryption module 544 can look up the requested encryption algorithm, obtain any necessary cryptographic keys from cryptographic key storage 546, perform the encryption/decryption request, and reply to access control module 512 with the encrypted/decrypted data.

Cryptographic key module 546 stores the set of cryptographic keys that are used in the various encryption algorithms performed by encryption/decryption module 544. The cryptographic keys can include symmetric keys and/or asymmetric keys corresponding to the cryptographic keys stored in the cryptographic expansion device of a mobile device. In other words, an encryption key stored in cryptographic key module 546 can form a symmetric or asymmetric key pair with a decryption key stored in the cryptographic expansion device of a mobile device, and/or an decryption key stored in cryptographic key module 546 can form a symmetric or asymmetric key pair with an encryption key stored in the cryptographic expansion device of a mobile device. Hence, just as the cryptographic keys in the cryptographic expansion device can be provisioned to be unique to a user, each cryptographic key in cryptographic key module 546 can be associated with a particular user of a mobile device.

Cryptographic key module 546 can also store a set of seed keys that are used to initialize the encryption/decryption module 544 in certain encryption algorithms such as AES, or used to generate random numbers used in certain encryption algorithms such as RSA and DSA. The cryptographic keys and/or seed keys stored in cryptographic key module 546 cannot be altered by an external source without a master key that was used during manufacturing of HSM 540.

HSM 540 can also include message authentication code (MAC)/hash module 542 to generate and verify MACs and/or hash codes for user messages sent to and from secure gateway device 550. A MAC or a hash code can be generated for a user message or a portion of the user message such that the recipient can verify the user message's data integrity and authenticity. In some embodiments, user messages received from an external network may include MAC or hash codes. MAC/hash module 542 can verify the MAC or hash codes of the received user messages before sending the user messages to a server in the host network of secure gateway device 550. If the MAC or hash code of a user message cannot be verified, the message can be discarded to prevent unauthorized user messages from entering the host network.

It should be appreciated that in some embodiments, secure gateway device 550 may or may not include HSM 540, and that one or more components of HSM 540 can be implemented using the processor and memory of secure gateway device 550. For example, in an exemplary embodiment, secure gateway device 550 may include a MAC/hash module 542, which is not part of a HSM, but is implemented with the processor and memory of secure gateway device 550, and/or secure gateway device 550 may include an encryption/decryption module 544, which is not part of a HSM, but is implemented with the processor and memory of secure gateway device 550.

Establishing a Secure Communication Channel

Figure 6:
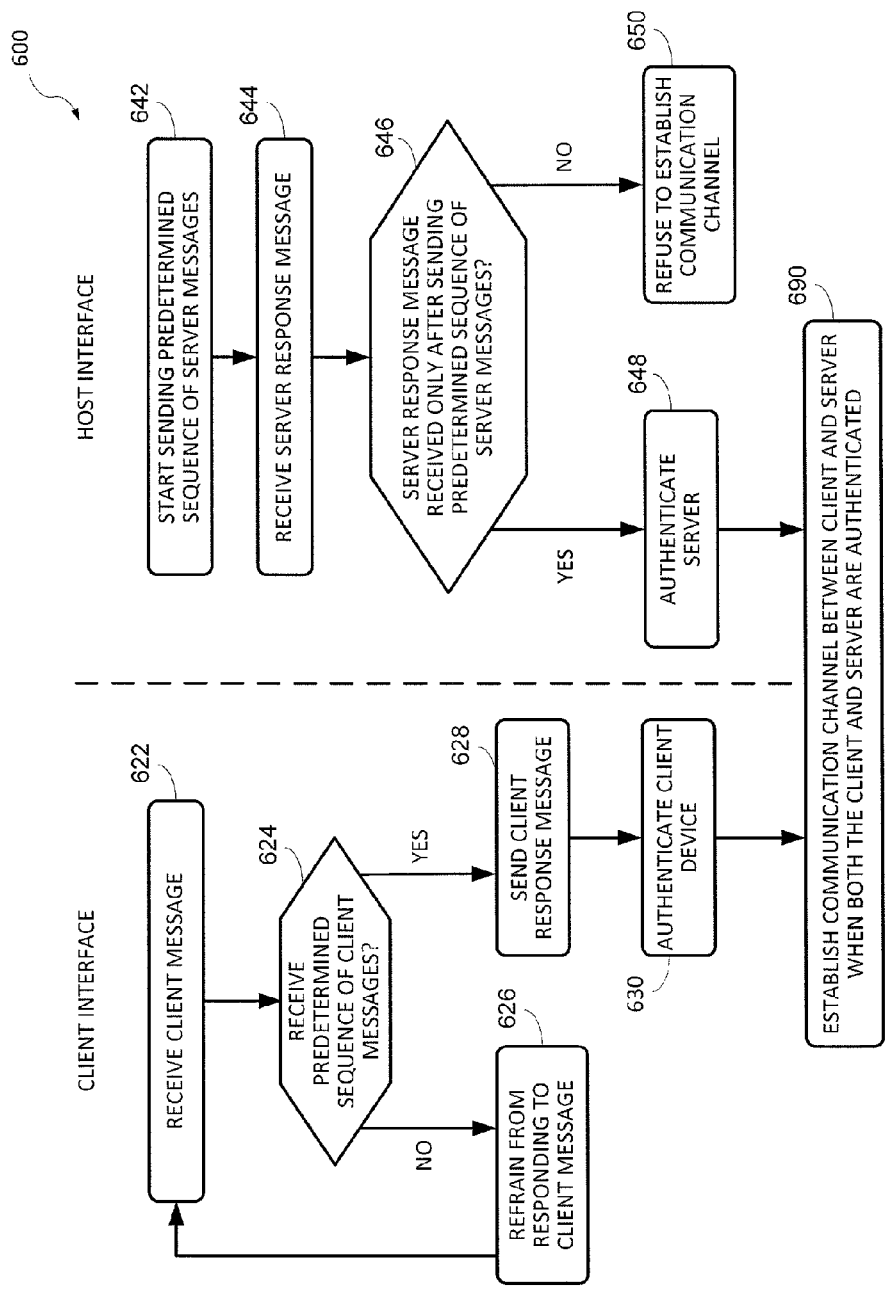
FIG. 6 illustrates a flow diagram for establishing a secure communication channel, according to one embodiment of the present invention.

FIG. 6 illustrates a flow diagram 600 for establishing a secure communication channel between a client device (e.g., a network device of mobile operator network 135 or IP network 145 that is communicatively coupled to mobile device 120 of FIG. 1) coupled to a client interface of a secure gateway device and a host device (e.g., a server of payment processing network 180 or issuer 160 or acquirer 170 of FIG. 1) coupled to a host interface of the secure gateway device, according to various embodiments. It should be understood that blocks 622-630 of the client interface can be performed independently of and/or concurrently with blocks 642-650 of the host interface.

A secure gateway device establishes secure communication channels between a client device and a host device using network messages. Each network message can include, for example, in the header of the network message, a source identifier, a destination identifier, a source port identifier, a destination port identifier, a synchronize flag, and an acknowledge flag. In some embodiments, each network message can also include an initial sequence number and an acknowledge sequence number. The source identifier identifies the sender device of the network message, and can be, for example, the IP address of the sender device. The destination identifier identifies the intended recipient device of the network message, and can be, for example, the IP address of the recipient device. The source port identifier identifies the port number associated with the logical port of the sender device that the network message is being sent from. The destination port identifier identifies the port number associated with the logical port of the recipient device that the network message is being sent to.

When a network message is described as being sent from port A of device X to port B of device Y, it should be understood that the network message includes a source identifier identifying device X, a destination identifier identifying device Y, a source port identifier identifying the port number associated with port A of device X, and a destination port identifier identify the port number associated with port B of device Y. When a sequence of network messages is described as having a sequence or order of source port identifiers, it should be understood that the network messages in the sequence of network messages are sent out from a sender device in a particular sequence or order of logical ports of the sender device. When a sequence of network messages is described as having a sequence or order of destination port identifiers, it is meant that the network messages in the sequence of network messages are sent to a recipient device in a particular sequence or order of logical ports of the recipient device.

The synchronize flag and acknowledge flag of a network message are used to identify whether a network message is a synchronize message, a synchronize-acknowledgment message, or an acknowledge message. A synchronize message is a network message that is used to initiate a secure communication channel with a device, and is identified by the synchronize flag being set and the acknowledge flag not being set. A synchronize-acknowledgment message is a network message that is used to acknowledge the receipt of a synchronize message, and is identified by the synchronize flag being set and the acknowledge flag being set. An acknowledge message is a network message that is used to acknowledge the receipt of a network message other than a synchronize message (e.g., acknowledge receipt of a synchronize-acknowledgment message), and is identified by the synchronize flag being not set and the acknowledge flag being set.

In some embodiments, a network message can also include an initial sequence number and an acknowledge sequence number that can be used to determine whether a network message is being sent in response to a previous network message. For example, a network message can be sent from a sender device with an initial sequence number X, and a recipient device can send a reply network message with an acknowledge sequence number of X+1 to indicate that the network message is being sent in response to the network message from the sender device that has the initial sequence number X. Thus, if a sender device sends multiple network messages and only one network message is received in reply, it is possible to determine which network message from the sender device that the reply network message is responsive to by comparing the acknowledge sequence number of the reply network message with the initial sequence numbers of the network messages from the sender device.

Referring back to FIG. 6, on the client interface of the secure gateway device, at block 622, the secure gateway device receives a client message from a client device on the client interface of the secure gateway device. At block 624, the secure gateway device determines if a predetermined sequence of client messages has been received, for example, by comparing the sequence of any previously received client messages combined with the client message received in block 622 with a predetermined sequence of client messages programmed in the access rules of the secure gateway device that secure gateway device expects to receive from an authorized client device. The predetermined sequence of client messages can be any one of or combination of the predetermined sequences of messages described above. In an exemplary embodiment, the predetermined sequence of client messages can be a predetermined sequence of client synchronize messages having a predetermined order of destination port identifiers identify client ports on the client interface. If the secure gateway device determines that the predetermined sequence of client messages has not yet been received, then at block 626, the secure gateway device refrains from responding to the client message, and the process continues back to block 622. If the secure gateway device determines that the entire predetermined sequence of client messages has been received, then at block 628, the secure gateway device sends a client response message. In one exemplary embodiment, the client response message can be a client synchronize-acknowledgment message. Then at block 630, the secure gateway device authenticates the client device to be an authorized client device that is allowed to communicate with a host device of the host network, because the predetermined sequence of client messages has been received from the client device.

On the host interface of the secure gateway device, the secure gateway device initiates the process of authenticating and establishing a connection to a host device such as a server of the host network of the secure gateway device by sending a predetermined sequence of server messages out the host interface. At block 642, the secure gateway device starts sending the predetermined sequence of server messages. The predetermined sequence of server messages can be any one of or combination of the predetermined sequences of messages described above. In an exemplary embodiment, the predetermined sequence of server messages can be a predetermined sequence of server synchronize messages have a predetermined order of destination port identifiers identify logical ports of the recipient server. At block 644, the secure gateway device receives a server response message from the server on the host interface. At block 646, the secure gateway device determines if the server response message is received only after the secure gateway device has finished sending the entire predetermined sequence of server messages. In other words, the secure gateway device determines if the server response message is received without any other server response message being received by the secure gateway device during the time when the secure gateway device is sending out the predetermined sequence of server messages. If the secure gateway device determines that the server response message is received prior to the completion of the secure gateway device sending out the predetermined sequence of server messages, then at block 650, the secure gateway device can refuse to establish a secure communication channel to the server.

In some embodiments, at block 646, in addition to determining if the server response message is received only after the secure gateway device has finished sending the entire predetermined sequence of server messages, the secure gateway device can also determine if the server response message is received in response to the last server message of the predetermined sequence of server messages, for example, by comparing an acknowledge sequence number in the server response message with the initial sequence number of the last server message of the predetermined sequence of server messages. The server response message is received in response to the last server message if the acknowledge sequence number equals the initial sequence number plus one. If the secure gateway device determines that the server response messages is not received in response to the last server message of the predetermined sequence of server messages, the secure gateway device can also refuse to establish a secure communication channel to the server at block 650.

If the secure gateway device determines that the server response message is received only after the secure gateway device has finished sending out the entire predetermined sequence of server messages, then at block 648, the secure gateway device authenticates the server to be an authorized host device that is allowed to communicate with a client device, because the server did not respond to the server messages until the predetermined sequence of server messages has been sent to the server. At block 690, the secure gateway device establishes a secure communication channel between the client device and the server through the secure gateway device when both the client and the server has been authenticated.

It should be noted that in various embodiments, the predetermined sequence of network messages used for authenticating the devices can be a predetermined sequence of synchronize messages, a predetermined sequence of synchronize-acknowledgment messages, or a predetermined sequence of acknowledgment messages, or any combination thereof.

In some embodiments, before the secure communication channel is established, the server may send a cryptographic key challenge to the secure gateway device. The cryptographic key challenge can include a random number and a request for the secure gateway device to encrypt the random number using a cryptographic key that is only know to authorized devices that are allowed to send user messages to the sever. The cryptographic key can be a symmetric key or an asymmetric key preloaded in the secure gateway device. Upon receiving the cryptographic key challenge from the server, the secure gateway device encrypts the received random number using the requested cryptographic key that was preloaded in the secure gateway device, and sends the encrypted random number to the server. The server then decrypts the received encrypted random number using a symmetric key or an asymmetric key corresponding to the cryptographic key. If the result matches the random number that server has previously sent to the secure gateway device, then the server secure communication channel is established. If the result matches the random number that server has previously sent to the secure gateway device, then the secure communication channel is established at block 690. If the result does not match the random number that server has previously sent to the server may refuse to the connection to the secure gateway device. A similar cryptographic key challenge can also be used between the client device and the secure gateway device if the client device includes cryptographic capabilities.

Exemplary Mobile Banking System with SMS or USSD Messages

FIG. 7 illustrates a mobile banking system 700 according to an exemplary embodiment. Mobile banking system 700 includes a mobile device 720 communicatively coupled to a mobile operator network 735, and a secure gateway device 750 that provides an interface between mobile operator network 735 and a payment processing network 790. Mobile device 720 can be a mobile phone or any of the mobile devices describe above. Mobile device 720 is equipped with a cryptographic expansion device attached to a SIM card installed in mobile device 720 according to any of the embodiments described above.

Mobile operator network 735 includes a base station 730, a Short Message Service Center (SMSC) and/or Unstructured Supplementary Service Data Center (USSDC) 732, and a SMSC/USSDC connector device 734. Base station 730 can communicate with mobile device 720 via SMS/USSD messages, and can relay SMS/USSD messages from base station 730 to SMSC/USSDC 732 for processing. SMSC/USSDC 732 processes SMS/USSD messages and forwards the SMS/USSD messages to their intended recipient. For SMS/USSD messages that are related to mobile banking transactions, SMSC/USSDC 732 can forward the SMS/USSD messages to SMSC/USSDC connector device 734. SMSC/USSDC connector device 734 serves as an interface on the mobile operator network side to relay SMS/USSD messages to payment processing network 790.

Payment processing network 790 includes a secure gateway device 750 and at least one server 785. Sever 785 can be a server associated with an issuer or with an acquirer, or can be a server that is communicatively coupled to a server of an issuer or acquirer. Secure gateway device 750 can be a secure gateway device according to any of the embodiments described above. Secure gateway device 750 can establish a connection between SMSC/USSDC connector device 734 and server 785 using a predetermined sequence of network messages according to any of the embodiments described above to provide a secure communication channel between payment processing network 790 and mobile device 720 to carry out mobile banking transactions.

For example, secure gateway device 750 can authenticate SMSC/USSDC connector device 734 upon receiving a predetermined sequence of network messages from SMSC/USSDC connector device 734. Secure gateway device 750 refrains from responding to network messages from SMSC/USSDC connector device 734 until the predetermined sequence of network messages is received. In one exemplary embodiment, the predetermined sequence of network messages can be a predetermined sequence of synchronize messages SYN1-SYN4 as shown in FIG. 7. Upon receiving the predetermined sequence of synchronize messages SYN1-SYN4, secure gateway device 750 responds with a synchronize-acknowledgment message to SMSC/USSDC connector device 734. SMSC/USSDC connector device 734 then responds with a acknowledge message, and a secure connection is established between SMSC/USSDC connector device 734 and secure gateway device 750.

The connection between secure gateway device 750 and server 785 can also be established using a predetermined sequence of network messages. For example, secure gateway device 750 can authenticate server 785 by sending a predetermined sequence of network messages to server 785. If server 785 responds to secure gateway device 750 before gateway device 750 has finished sending out the predetermined sequence of network messages to server 785, then secure gateway device 750 can determine that server 785 is not an authorized device, and a connection to server 785 is not established. If server 786 responds only after the predetermined sequence of network messages has been sent to server 785, then secure gateway device 750 can establish a connection to server 785. In one exemplary embodiment, the predetermined sequence of network messages can be a predetermined sequence of synchronize messages SYN1'-SYN4' as shown in FIG. 7. Upon receiving the predetermined sequence of synchronize messages SYN1'-SYN4', server 785 responds with a synchronize-acknowledgment message to then secure gateway device 750. Secure gateway device 750 then responds with a acknowledge message, and a secure connection is established between then secure gateway device 750 and secure server 785. After both server 785 and SMSC/USSDC connector device 734 are authenticated by secure gateway device 750, a secure communication channel is established between SMSC/USSDC connector device 734 of mobile operator network 735 and server 785 of payment processing network 790.

It should be noted that in various embodiments, the predetermined sequence of network messages used for either the connection between SMSC/USSDC connector device 734 and secure gateway device 750, or between secure gateway device 750 and server 785 can be a predetermined sequence of synchronize messages, a predetermined sequence of synchronize-acknowledgment messages, or a predetermined sequence of acknowledgment messages, or any combination thereof.

Having established a secure communication channel between the two networks, mobile banking transactions can be conducted by mobile device 720 in a secure manner. To conduct a mobile banking transaction such as an account inquiry (e.g., checking account balance, looking up transaction history, etc.), a mobile payment or purchase, a mobile money transfer, or the like, a user can initiate the mobile banking transaction by accessing a mobile banking application stored in mobile device 720 (e.g., stored in a cryptographic expansion device) using the user interface of mobile device 720. The user can request the mobile banking application to conduct a mobile banking transaction by selecting the desired transaction on a user menu of the mobile banking application. In response to receiving the user request, the mobile banking application may prompt the user to enter additional information such as a personal identification number (PIN), a primary account number (PAN), or other user account information associated with the account that is being used in the mobile banking transaction (e.g., the account that is the subject of an account inquiry, or an account from which funds will be drawn to make a purchase or payment). The mobile banking application may also retrieve user account information stored in the cryptographic expansion device or mobile device 720, as well as retrieve other information about the identity of mobile device 720 or about the user of mobile device 720, such as a mobile device identifier (e.g., an International Mobile Equipment Identity or IMEI) stored in mobile device 720, or mobile subscriber information such as unique serial number (ICCID) and/or the international mobile subscriber identity (IMSI) of the SIM card.

If the mobile banking transaction involves a payment or money transfer, the mobile banking application may also prompt the user for additional transaction information such as a transaction amount, a payee identifier, a merchant identifier, or a recipient account identifier that the user intends to pay or transfer money to. In some embodiments, the mobile banking application may also obtain such information using any of the communication interfaces available on mobile device 720 such as looking up the price of an item from a merchant's website via the internet on mobile device 720.

The mobile banking application then generates a transaction request message that includes information identifying the type of mobile banking transaction being requested by the user, and any combination of the information described above that may be used to carry out the mobile banking transaction such as user account information. For example, the transaction request message may include user account information identifying the account being used in the mobile banking transaction, a transaction amount, a merchant identifier, a mobile device identifier, and/or mobile subscriber information. The transaction request message is then encrypted by the cryptographic expansion device attached to the SIM card of mobile device 720. The transaction request message can be encrypted by the cryptographic expansion device using an encryption key stored therein that is associated with and provisioned to be specific to the user of mobile device 720. Cryptographic expansion device may also generate a MAC/hash code on any portion of or the entire transaction request message, and includes the MAC/hash code in the encrypted transaction request message.

Mobile device 720 then sends the encrypted transaction request message encapsulated in a SMS/USSD message, or other forms of communication that mobile device 720 can send, to base station 730 over the air towards secure gateway device 750. Upon receiving the SMS/USSD message encapsulating the encrypted transaction request message, base station 730 can relay the SMS/USSD message through mobile operator network 735 to SMSC/USSDC 732 for processing. SMSC/USSDC 732 then determines the SMS/USSD message is associated with a mobile banking transaction and forwards the encrypted transaction request message SMSC/USSDC connector device 734 to secure gateway device 750. At no point between mobile device 720 and secure gateway device 750 is the transaction request message sent in plaint text form. In other words, the transaction request message remains encrypted from the point when it leaves mobile device 720 until it reaches secure gateway device 750.

Upon receiving the encrypted transaction request message, secure gateway device 750 decrypts the encrypted transaction request message using a decryption key corresponding to the encryption key that was used by the cryptographic expansion device of mobile device 720. In some embodiments, the decryption key is associated with and provisioned to be specific to the user of mobile device 720. Secure gateway device 750 can determine which decryption key is associated with the user of mobile device 720, for example, by using information in the SMS/USSD message provided to secure gateway device 750 from SMSC/USSDC connector device 734 identifying the sender device of the SMS/USSD message (e.g., a phone number, mobile device identifier, or mobile subscriber information). Secure gateway device 750 may also verify the MAC/hash code of the decrypted transaction request message to check the integrity of the information in the decrypted transaction request message. Secure gateway device 750 then forwards the transaction request message to server 785 for processing. In some embodiments, secure gateway device 750 can re-encrypt the transaction request message before send the transaction request message to server 785 for processing. The re-encryption can be performed using the same or a different cryptographic key than what was used by the cryptographic expansion device of mobile device 720.

In some embodiments, if the decrypted transaction request message contains information that does not match the user of mobile device 720 (e.g., decrypted transaction request message includes user account information that does not match any accounts of the user), or if the MAC/hash code does not correspond to the contents of the decrypted transaction request message, secure gateway device 750 may discard the transaction request message instead of forwarding it on to payment processing network 790.

If the mobile banking transaction requested by the user is an account inquiry such as checking the account balance of the user's financial account or retrieving the transaction history of the user's financial account, server 785 may be a server of the issuer of the user's financial account that is the subject of the inquiry. Server 785 can process the account inquiry using the user account information provided in the transaction request message, and respond to secure gateway device 750 with the requested account information in a transaction response message. Secure gateway device 750 can encrypt the transaction response message and sends the encrypted transaction response message to mobile device 720 through mobile operate network 735. The transaction response message can be sent to mobile device 720 as a SMS/USSD message, or other forms of communication that mobile device 720 can receive. Upon receiving the encrypted transaction response message, the cryptographic expansion device of mobile device 720 can decrypt the transaction response message, and the requested account information can be presented to the user through the user interface of mobile device 720.

If the mobile banking transaction requested by the user involves a payment such as a mobile payment, a mobile purchase, or a mobile money transfer, sever 785 can be a server of payment processing network 790 that can forward the transaction request message to a server of an acquirer associated with the recipient of the payment. Alternatively, sever 758 can be the server of the acquirer. The server of the acquirer can then generate an authorization request message based on the transaction request message. The server of acquirer may send the authorization request message to a server of the issuer of the user's financial account to obtain authorization for the payment transaction. Upon authorization, server 785 may send a transaction response message to secure gateway device 750 indicating the payment was successful. Secure gateway device 750 may encrypt the transaction response message and then send the encrypted transaction response message to mobile device 720 through mobile operate network 735. The encrypted transaction response message can be sent to mobile device 720 as a SMS/USSD message, or other forms of communication that mobile device 720 can receive. Upon receiving the encrypted transaction response message, the cryptographic expansion device of mobile device 720 can decrypt the transaction response message, and confirmation of the payment can be presented to the user through the user interface of mobile device 720.

Exemplary Mobile Banking System with RF or NFC Communications

FIG. 8 illustrates a mobile banking system 800 according to another exemplary embodiment. Mobile banking system 800 includes a mobile device 820 that can communicate with a contactless reader 840 via RF/NFC communications. Contactless reader 840 can be a RF/NFC enabled reader that is associated with a merchant that the user of mobile device 820 intends to purchase goods or services from, or a payee that the user of mobile device 820 intends to send a payment to. For example, in some embodiments, contactless reader 840 can be a RF/NFC enabled point-of-sale (POS) terminal at a merchant. Contactless reader 840 can also be a mobile payment device that includes a RF/NFC contactless interface such as another mobile phone, a portable computing device such as a tablet computer, or a RF/NFC payment adaptor attached to a portable computing device. Contactless reader 840 can communicate with secure gateway device 850 through IP network 845 that can include both wired and wireless connectivity to exchange communications between contactless reader 840 and a terminal connector device 846 that is communicatively coupled to secure gateway device 850. The terminal connector device 846 can be, for example, a gateway device of IP network 845. If contactless reader 840 is another mobile device, contactless reader 840 may communicate with secure gateway device 850 through a cellular or wireless network such as mobile operator network 835.

A secure connection between terminal connector device 846 and secure gateway device 850, and a secure connection between secure gateway device 850 and server 885 can each be established using a similar predetermined sequence of network messages as describe above with reference to SMSC/USSDC connector device 734, secure gateway device 750, and server 785 of FIG. 7, and hence need not be repeated here.

According to various embodiments, a user of mobile device 820 can initiate a purchase of goods or services from a merchant or make a payment to a payee by using mobile device 820 to communicate with contactless reader 840 of the merchant or payee using RF/NFC communications. The user can access a mobile banking application stored in mobile device 820 using the user interface of mobile device 820. The user can request the mobile banking application to conduct the purchase by selecting a purchase transaction on the user menu of the mobile banking application, or a payment by selecting a payment transaction on the user menu of the mobile banking application.

In response to receiving the user request, the mobile banking application may prompt the user to enter additional information such as a personal identification number (PIN), a primary account number (PAN), or other user account information associated with the account that is being used in the mobile banking transaction (e.g., the account that is the subject of an account inquiry, or an account from which funds will be drawn to make a purchase or payment). The mobile banking application may also retrieve user account information stored in the cryptographic expansion device or mobile device 820, as well as retrieve other information about the identity of mobile device 820 or about the user of mobile device 820, such as a mobile device identifier (e.g., an International Mobile Equipment Identity or IMEI) stored in mobile device 720, or mobile subscriber information such as unique serial number (ICCID) and/or the international mobile subscriber identity (IMSI) of the SIM card. The mobile banking application may also prompt the user for additional transaction information such as a transaction amount. In some embodiments, the mobile banking application may also obtain transaction information including a transaction amount and a merchant identifier or a payee account identifier from contactless reader 840 via RF/NFC.

The mobile banking application then generates a transaction request message that includes information identifying the type of mobile banking transaction being requested by the user, and any combination of the information described above that may be used to carry out the mobile banking transaction such as user account information. For example, the transaction request message may include the account identifier identifying the account being used in the mobile banking transaction, a transaction amount, a merchant identifier, a mobile device identifier, and/or mobile subscriber information. The transaction request message is then encrypted by the cryptographic expansion device attached to the SIM card of mobile device 820. The transaction request message can be encrypted by the cryptographic expansion device using an encryption key stored therein that is associated with user account information of a financial account of the user of mobile device 820. Cryptographic expansion device may also generate a MAC/hash code on any portion of or the entire transaction request message, and includes the MAC/hash code in the encrypted transaction request message.

Mobile device 820 then sends the encrypted transaction request message as a RF/NFC communication, or other forms of contactless communication that mobile device 820 can send, to contactless reader 840. Upon receiving the RF/NFC communication with the encrypted transaction request message, contactless reader 840 can relay the encrypted transaction request message through IP network 845 to terminal connector device 846. Terminal connector device 846 then sends the encrypted transaction request message to secure gateway device 850. At no point between mobile device 820 and secure gateway 850 is the transaction request message sent in plain text form. In other words, the transaction request message remains encrypted from the point when it leaves mobile device 820 until it reaches secure gateway device 850.

Upon receiving the encrypted transaction request message, secure gateway device 850 decrypts the encrypted transaction request message using a decryption key corresponding to the encryption key that was used by the cryptographic expansion device of mobile device 820. In some embodiments, the decryption key can be associated with the user of mobile device 820. Secure gateway device 850 may also verify the MAC/hash code of the decrypted transaction request message to check the integrity of the information in the decrypted transaction request message. Secure gateway device 850 then forwards the transaction request message to server 885 for processing. In some embodiments, secure gateway device 850 can re-encrypt the transaction request message before sending the transaction request message to server 885 for processing. The re-encryption can be performed using the same or a different cryptographic key than what was used by the cryptographic expansion device of mobile device 820.

In some embodiments, if the decrypted transaction request message contains information that does not match the user of mobile device 820 (e.g., decrypted transaction request message includes user account information that does not match any accounts of the user), or if the MAC/hash code does not correspond to the contents of the decrypted transaction request message, secure gateway device 850 may discard the transaction request message instead of forwarding it on to payment processing network 890.

In some embodiments, sever 858 can be the server of the acquirer. Sever 858 can generate an authorization request message based on the transaction request message. Sever 858 may send the authorization request message to a server of the issuer of the user's financial account to authorization the payment transaction. Upon authorization, sever 858 may send a transaction response message to secure gateway device 850 indicating the purchase or payment was successful. Secure gateway device 850 may encrypt the transaction response message and then send the encrypted transaction response message to mobile device 820 through IP network 845. The encrypted transaction response message can be sent to mobile device 820 as a RF/NFC communication, or other forms of communication that mobile device 820 can receive. Upon receiving the encrypted transaction response message, the cryptographic expansion device of mobile device 820 can decrypt the transaction response message, and the confirmation of the purchase or payment can be presented to the user through the user interface of mobile device 820. In another embodiment, secure gateway device 8590 can send an unencrypted transaction response message to contactless reader 840, and the confirmation of the purchase can be displayed to the user on the contactless reader 840.

Methods for Conducting a Mobile Banking Transaction

Figure 9A:
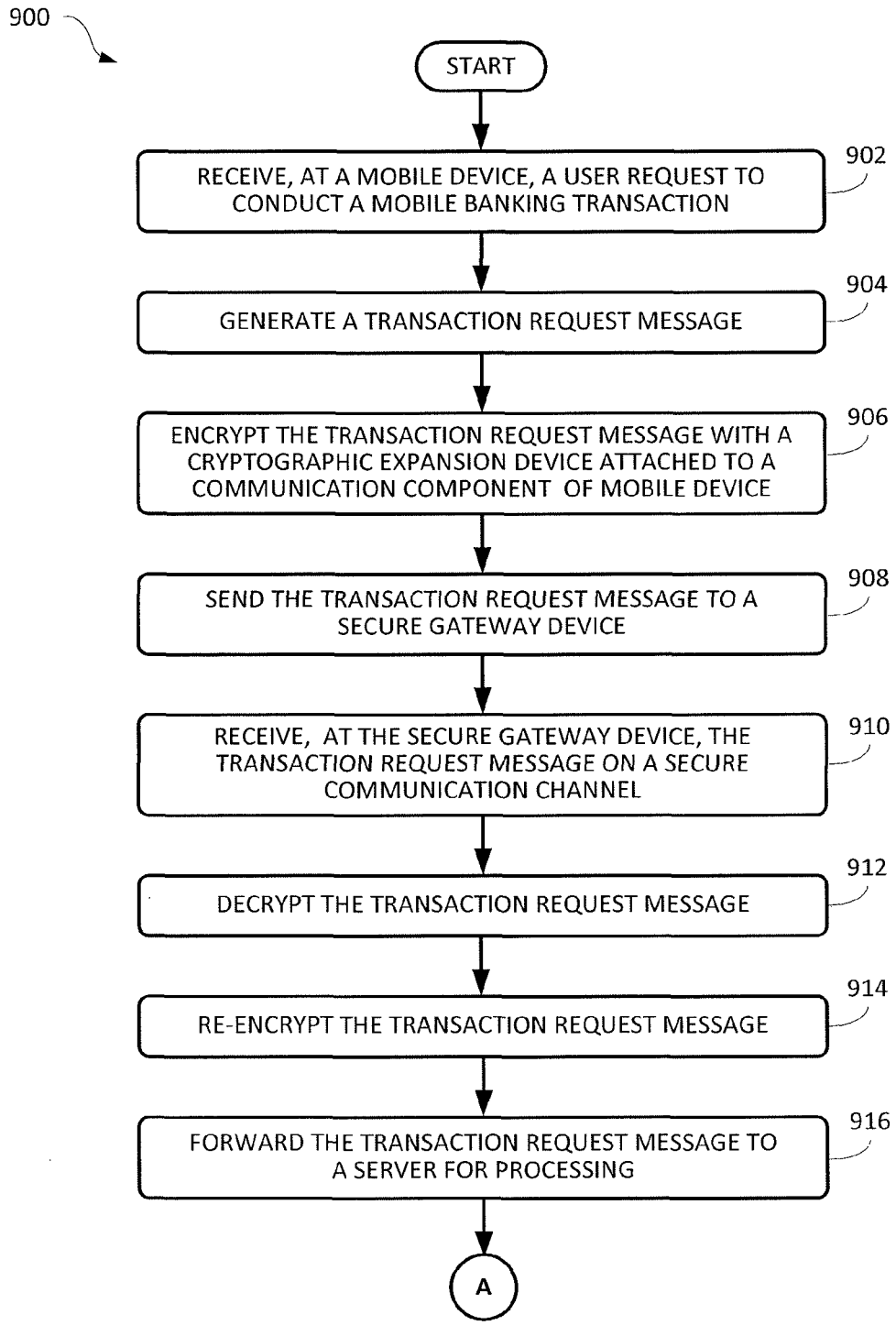
FIG. 9A illustrates a flow diagram for conducting a mobile banking transaction, according to one embodiment of the present invention.
Figure 9B:
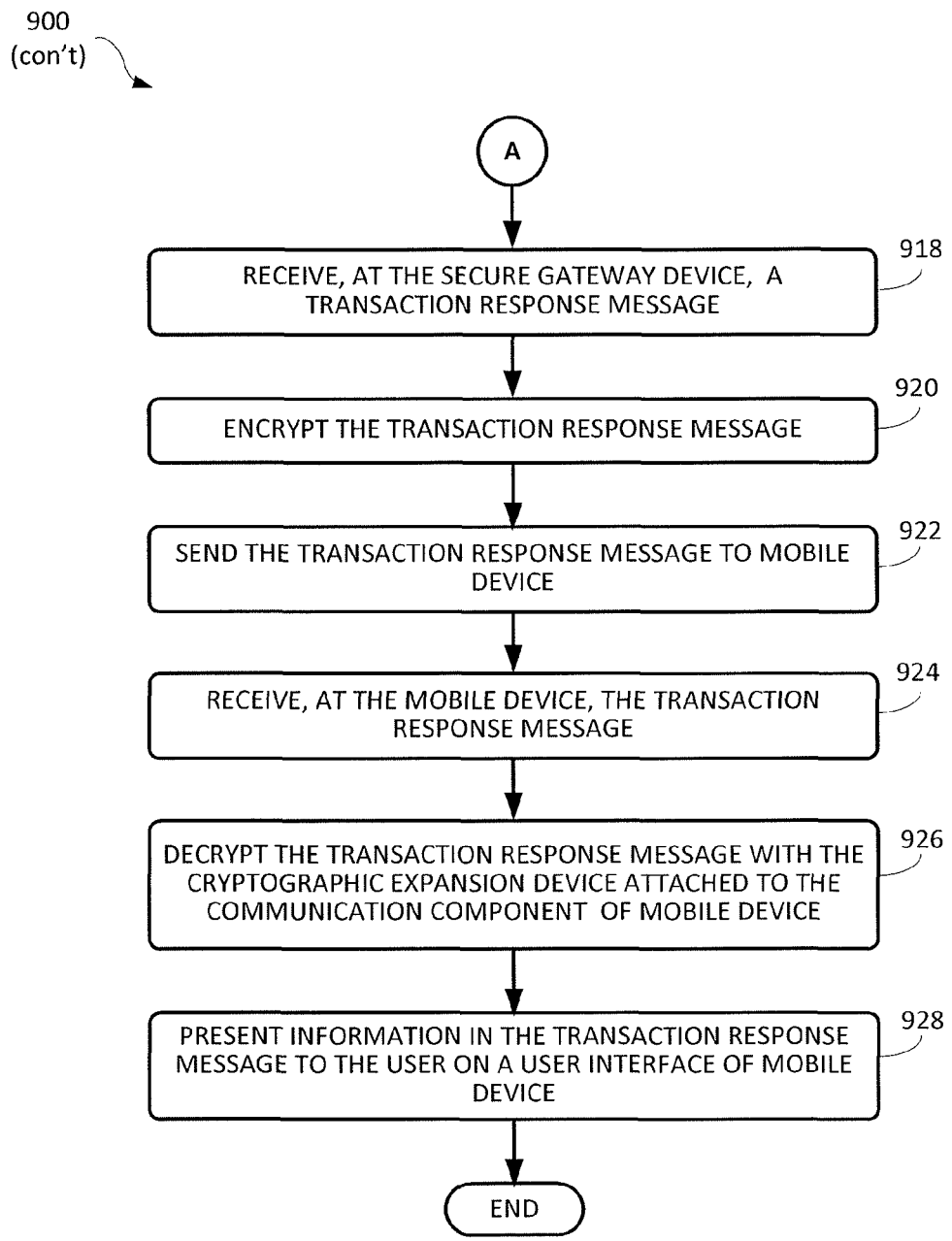
FIG. 9B illustrates a flow diagram for conducting a mobile banking transaction according to one embodiment of the present invention.

FIG. 9A-9B illustrates a flow diagram 900 for conducting a mobile banking transaction using a mobile device according to various embodiments. The mobile banking transaction can be an account inquiry, a mobile payment, a mobile purchase, a mobile money transfer, or other types of banking transaction conducted with a mobile device. A user of a mobile device equipped with a cryptographic expansion device attached to a communication component of the mobile device according to any embodiments described above can initiate a mobile banking transaction by selecting a type of transaction the user wants to perform on a mobile banking application stored in the mobile device. Referring to FIG. 9A, at block 902, a user request to conduct a mobile banking transaction is received at the mobile device. The mobile banking application may prompt the user for addition information such as user account information or other information described above that will be used to conduct the mobile banking transaction.

At block 904, the mobile banking application of the mobile device generates a transaction request message. At block 906, the transaction request message is encrypted by the cryptographic expansion device attached to a communication component of the mobile device. In some embodiments, the communication component can be a SIM card. At block 908. The mobile device sends the transaction request message to a secure gateway device according to any of the embodiments described above. The transaction request message can originate from the mobile device as a SMS message, a USSD message, a RF communication, a NFC communication, or any other forms of communication that the mobile device is capable of sending.

At block 910, the secure gateway device receives the transaction request message on a secure communication channel that is established according to any of the embodiments described above. Upon receiving the transaction request message, at block 912, the gateway device decrypts the transaction request message. At block 914, the gateway device re-encrypts or re-zones the transaction request message for transmission to a server of a payment processing network. At block 916, the gateway device forwards the transaction request message to a server of the payment processing network for processing. The server of the payment processing network then processes the mobile banking transaction requested by the user as indicated in the transaction request message and generates a transaction response message which is sent to the secure gateway device. The process then continues to FIG. 9B.

Referring to FIG. 9B, at block 918, the secure gateway device receives the transaction response message. At block 920, the secure gateway device encrypts the transaction response message. At block 922, the secure gateway device sends the transaction response message to the mobile device. At block 924, the mobile device receives the transaction response message. Upon receiving the transaction response message, at block 926, the transaction response message is decrypts by the cryptographic expansion device attached to the communication component of the mobile device. At block 928, the mobile device presents information in the transaction response message, such as requested account information or outcome of a payment transaction or purchase, to the user on a user interface of the mobile device.

Mobile Device

Figure 10:
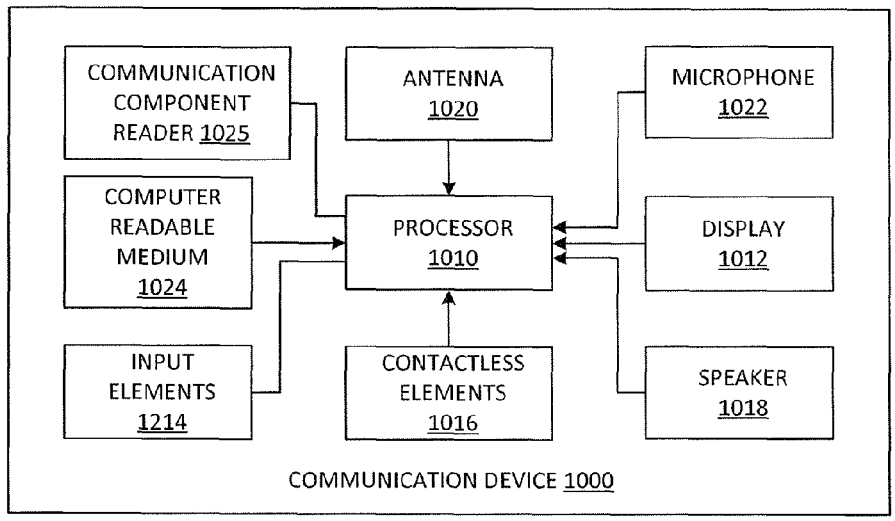
FIG. 10 illustrates a mobile device, according to one embodiment of the present invention.

FIG. 10 shows a mobile device 1000 according to the some of the embodiments described above. The mobile device 1000 includes a communication component reader 1025 for accepting a communication component such as a SIM card. The mobile device 1000 also includes a display 1012, an input element 1014, computer readable medium 1024 such as volatile and non-volatile memory, processor 1010 and at least one antenna 1020. In addition, the mobile device 1000 may include a dual interface including both contact (not shown) and contactless interface 1016 for transferring information through direct contact or through an integrated chip, which may be coupled to a second antenna. In addition, the mobile device 1000 may be capable of communicating through a cellular network, a wireless provider network, or a mobile operator network, such as GSM through an antenna 1020, for example to send and receive Short Message Service (SMS) messages or Unstructured Supplementary Service Data (USSD) messages. Thus, the mobile device 1000 may be capable of transmitting and receiving information wirelessly through both short range NFC, radio frequency (RF) and cellular connections. In some embodiments, mobile device 1000 may have cryptographic capabilities to send encrypted messages and/or communications, and/or messages protected with message authentication codes or hash codes.

Computer System

Figure 11:
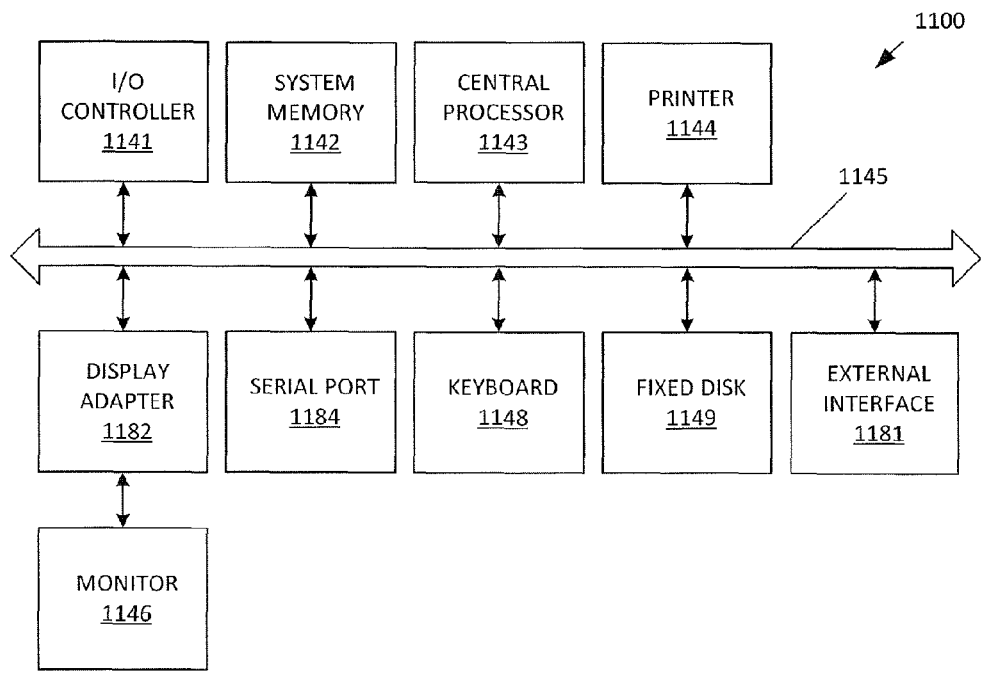
FIG. 11 illustrates a computer system, according to various embodiments of the present invention.

FIG. 11 is a block diagram of a computer system that may be used to implement any of the devices (e.g., secure gateway device, client device, host device, server, network device terminal connector, SMSC/USSDC connector, etc.) described above. The subsystems shown in FIG. 11 are interconnected via a system bus 1145. Additional subsystems, which may be optional, such as a printer 1144, a keyboard 1148, a fixed disk 1149, a monitor 1146 that is coupled to display adapter 1182, and others are shown. Peripherals and input/output (I/O) devices, which couple to I/O controller 1141, can be connected to the computer system by any number of means known in the art, such as serial port 1184. For example, serial port 1184 or external interface 1181 can be used to connect the computer apparatus to a wide area network such as the Internet, a mouse input device, or a scanner. The interconnection via system bus 1145 allows the central processor 1143 to communicate with each subsystem and to control the execution of instructions from system memory 1142 or the fixed disk 1149, as well as the exchange of information between subsystems. The system memory 1142 and/or the fixed disk 1149 may embody a non-transitory computer readable medium which contains instructions that cause the processor to execute the methods described herein.

In certain implementations, individual blocks (or steps) described above with respect to the Figures may be combined, eliminated, or reordered. Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for conducting a mobile banking transaction using a mobile device, the method comprising:
    establishing, at a secure gateway device, a secure communication channel with the mobile device, the secure communication channel being established by:
        receiving a predetermined sequence of network messages having a predetermined order of port identifiers, wherein at least two of the network messages have different port identifiers that are respectively received on different ports of the secure gateway device, and wherein the secure gateway device refrains from responding to a network message until the predetermined sequence of network messages has been received;
    receiving, at the secure gateway device, a transaction request message originating from the mobile device on the secure communication channel for conducting a mobile banking transaction, wherein the transaction request message is encrypted by a cryptographic expansion device attached to a communication component of the mobile device;
    decrypting, by the secure gateway device, the transaction request message originating from the mobile device; and
    forwarding the transaction request message to a server for processing.

2. The method of claim 1, wherein the communication component is a SIM card, and the cryptographic expansion device is in the form of a label that is attached to the SIM card.

3. The method of claim 2, further comprising
    re-encrypting the transaction request message prior to forwarding the transaction request message to the server.

4. The method of claim 2, wherein the transaction request message originated from the mobile device as a Short Message Service (SMS) message or a Unstructured Supplementary Service Data (USSD) message.

5. The method of claim 2, wherein the transaction request message originated from the mobile device as a Near Field Communication (NFC) message or a Radio Frequency (RF) communication message.

6. The method of claim 2, wherein the cryptographic expansion device is an adhesive label.

7. The method of claim 1, wherein the predetermined sequence of network messages comprises a sequence of synchronize messages.

8. A method for conducting a mobile banking transaction using a mobile device, the method comprising:
    receiving, at the mobile device, a user request to conduct the mobile banking transaction;
    generating a transaction request message;
    encrypting the transaction request message with a cryptographic expansion device attached to a communication component of the mobile device;
    establishing a secure communication channel with a secure gateway device, the secure communication channel being established by:
        sending a predetermined sequence of network messages having a predetermined order of port identifiers, wherein at least two of the network messages have different port identifiers that are respectively sent to different ports of the secure gateway device, and wherein the secure gateway device refrains from responding to a network message until the predetermined sequence of network messages has been received; and
    sending the transaction request message on the secure communication channel to a secure gateway device, wherein the secure gateway device is to forward the transaction request message to a server for processing.

9. The method of claim 8, wherein the communication component is a SIM card, and the cryptographic expansion device is in the form of a label that is attached to the SIM card.

10. The method of claim 9, wherein the transaction request message is sent from the mobile device as a Short Message Service (SMS) message or a Unstructured Supplementary Service Data (USSD) message.

11. The method of claim 9, wherein the transaction request message is sent from the mobile device as a Near Field Communication (NFC) communication or a Radio Frequency (RF) communication.

12. The method of claim 9, wherein the cryptographic expansion device is an adhesive label.

13. A mobile banking system comprising:
    a cryptographic expansion device comprising a hardware security module (HSM) to encrypt a transaction request message being sent from a mobile device to conduct a mobile banking transaction, wherein the cryptographic expansion device is in the form of a label that is attached to a communication component of the mobile device; and a secure gateway device communicatively coupled to the mobile device to receive and forward the transaction request message to a server for processing, the secure gateway device comprising:

an access control module to establish a secure communication channel to the mobile device using a predetermined sequence of network messages, wherein the predetermined sequence of network messages have a predetermined order of port identifiers, at least two of the network messages have different port identifiers that are respectively received on different ports of the secure gateway device, and wherein the secure gateway device refrains from responding to a network message until the predetermined sequence of network messages has been received; and a cryptographic module to decrypt the transaction request message originating from the mobile device received on the secure communication channel.

14. The mobile banking system of claim 13, wherein the communication component is a SIM card, and the cryptographic expansion device is in the form of a label that is attached to the SIM card.

15. The mobile banking system of claim 14, wherein the transaction request message is sent from the mobile device as a Short Message Service (SMS) message or a Unstructured Supplementary Service Data (USSD) message.

16. The mobile banking system of claim 14, wherein the transaction request message is sent from the mobile device as a Radio Frequency (RF) communication or a Near Field Communication (NFC) communication.

17. The mobile banking system of claim 14, wherein the cryptographic expansion device is an adhesive label.

18. The mobile banking system of claim 13, wherein the cryptographic module of the secure gateway device is further to re-encrypt the transaction request message prior to the secure gateway device forwarding the transaction request message to the server.

19. The mobile banking system of claim 13, wherein the predetermined message sequence comprises a sequence of synchronize messages.

20. The mobile banking system of claim 13, wherein the HSM includes a public processing unit and a secure processing unit that is accessible only via the public processing unit.

* * * * *